US011167751B2

(12) United States Patent
Liu et al.

(10) Patent No.: US 11,167,751 B2
(45) Date of Patent: Nov. 9, 2021

(54) FAIL-OPERATIONAL ARCHITECTURE WITH FUNCTIONAL SAFETY MONITORS FOR AUTOMATED DRIVING SYSTEM

(71) Applicant: Baidu USA LLC, Sunnyvale, CA (US)

(72) Inventors: Xiaodong Liu, San Jose, CA (US); Ning Qu, Fremont, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 346 days.

(21) Appl. No.: 16/252,166

(22) Filed: Jan. 18, 2019

(65) Prior Publication Data

US 2020/0231142 A1 Jul. 23, 2020

(51) Int. Cl.
| | | |
|---|---|---|
| *B60W 30/08* | (2012.01) | |
| *G01C 21/28* | (2006.01) | |
| *G01S 13/93* | (2020.01) | |
| *G01S 17/93* | (2020.01) | |
| *G05D 1/00* | (2006.01) | |

(Continued)

(52) U.S. Cl.
CPC .......... *B60W 30/08* (2013.01); *B60W 10/04* (2013.01); *B60W 10/18* (2013.01); *G01C 21/28* (2013.01); *G01C 21/3461* (2013.01); *G01S 13/931* (2013.01); *G01S 17/931* (2020.01); *G05D 1/0088* (2013.01); *G05D 1/0214* (2013.01); *B60W 50/0205* (2013.01); *B60W 2050/021* (2013.01); *B60W 2420/52* (2013.01); *B60W 2554/00* (2020.02); *B60W 2710/0605* (2013.01);

(Continued)

(58) Field of Classification Search
None
See application file for complete search history.

(56) References Cited

U.S. PATENT DOCUMENTS 10,816,346 B2 10/2020 Wheeler et al.
2017/0139411 A1* 5/2017 Hartung ............... G05D 1/0077

(Continued)

FOREIGN PATENT DOCUMENTS

| EP | 1739454 A2 | 1/2007 |
| WO | 2017079236 A2 | 5/2017 |

OTHER PUBLICATIONS

NVIDA Self-Driving Safety-Report 2018 (Year: 2018).*

*Primary Examiner* — Kevin P Mahne

(74) *Attorney, Agent, or Firm* — Womble Bond Dickinson (US) LLP

(57) ABSTRACT

Systems and methods are disclosed for dynamically adjusting effective sensor coverage coordinates of a sensor used to assist in navigating an autonomous driving vehicle (ADV) in response to environmental conditions that may affect the ideal operation of the sensor. An ADV includes a navigation system and a safety monitor system that monitors some, or all, of the navigation system, including monitoring: dynamic adjustment of effective sensor coverage coordinates of a sensor and localization of the ADV within a high-definition map. The ADV safety monitor system further determines safety-critical objects surrounding the ADV, determines safe areas to navigate the ADV, and ensures that the ADV navigates only to safe areas. An automated system performance monitor determines whether to pass-through ADV navigation control commands, limit one or more control commands, or perform a fail-operational behavior, based on the ADV safety monitor systems.

21 Claims, 20 Drawing Sheets

(51) Int. Cl.
*G05D 1/02* (2020.01)
*B60W 10/04* (2006.01)
*B60W 10/18* (2012.01)
*G01C 21/34* (2006.01)
*G01S 13/931* (2020.01)
*G01S 17/931* (2020.01)
*B60W 50/02* (2012.01)

(52) U.S. Cl.
CPC ............... *B60W 2710/18* (2013.01); *G01S 2013/93185* (2020.01); *G05D 2201/0213* (2013.01)

(56) References Cited

U.S. PATENT DOCUMENTS

| | | | | |
|---|---|---|---|---|
| 2017/0322557 A1* | 11/2017 | Fujita | ................... | G05D 1/0223 |
| 2018/0039267 A1* | 2/2018 | Miyake | ..................... | B60T 7/12 |
| 2018/0326991 A1* | 11/2018 | Wendt | ................... | B60W 50/04 |
| 2018/0364705 A1* | 12/2018 | Yunoki | ................ | G05D 1/0088 |
| 2019/0072674 A1* | 3/2019 | Otaki | ........................ | G01S 7/41 |
| 2019/0106117 A1* | 4/2019 | Goldberg | ................. | G06F 11/00 |
| 2019/0300007 A1* | 10/2019 | Hilligardt | ......... | B60W 50/0205 |
| 2019/0310636 A1* | 10/2019 | Halder | ................. | G05D 1/0221 |

\* cited by examiner

| Feature 1005 | Camera | Radar | LIDAR | Camera + Radar + LIDAR |
|---|---|---|---|---|
| 1010 Object Detection | ◐ | ◐ | ○ | ○ |
| 1015 Object Classification | ○ | ● | ◐ | ○ |
| 1020 Distance Estimation | ◐ | ○ | ○ | ○ |
| 1025 Velocity Estimation | ● | ○ | ◐ | ○ |
| 1030 Range of visibility | ◐ | ○ | ◐ | ○ |
| 1035 Lane Tracking | ○ | ● | ● | ○ |
| 1040 Functionality in bad weather | ● | ○ | ◐ | ○ |
| 1045 Functionality in poor lighting | ◐ | ○ | ○ | ○ |

○ Good
◐ Fair
● Poor

FIG. 10

FAIL-OPERATIONAL ARCHITECTURE WITH FUNCTIONAL SAFETY MONITORS FOR AUTOMATED DRIVING SYSTEM

TECHNICAL FIELD

Embodiments of the present disclosure relate generally to operating autonomous vehicles. More particularly, embodiments of the disclosure relate to safe operation of autonomous driving vehicles under varying environmental conditions.

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

Autonomous vehicle safety relies heavily on various sensors, i.e. camera, RADAR, LIDAR, etc., to provide data and dynamically perceive the environment around. The quality of sensor data can have direct effect on autonomous system's performance from the classification of objects, predicting a dynamic object's trajectory, and planning a safe path for the vehicle. It is well-known that each sensor has advantages and limitations, as well as strong dependency on environmental conditions such as whether it is daylight or night time, raining, foggy, dusty, or whether one or more sensors are impaired with dirt or other debris. In the past, work has been done in an attempt to utilize each sensor's strengths. Verification and validation are commonly used to improve sensor performance and algorithm's effectiveness all together, which is very important, but not in the predictive way of addressing the impact of dynamic environment changes on sensors as well as perception algorithm performance. The prior art does not provide methods to dynamically adjust effective sensor coverage as well as identify sensor limitation(s) to ensure that an area around the autonomous vehicle is monitored by at least one verified/qualified sensor according to both ISO 26262 (E/E system with fault) and ISO 21448 (SOTIF)—E/E system without fault but with limitation.

Further, it has become common understanding in the automotive industry that to support SAE Level 4/5 vehicles, an automated driving system is required to be fail-operational, besides or in addition to a low voltage power supply system, a steering system, a brake system, or a network communication, etc. An automated driving system needs to address system performance limitations of sensors and perception algorithms as vehicle environmental conditions change, to ensure autonomous vehicle safety. One current industry approach is to design two independent automated driving systems to be redundant to accomplish a fail-operational system. However, even a redundant system can become degraded if the environmental conditions are such that the sensors cannot achieve their full specification performance, such as when it is raining, or snowing, there is bright light, absence of light, or the vehicle is inside a tunnel or between buildings in a city where communication and GPS have difficulty.

Correctly perceiving the environment around an autonomous driving vehicle and defining safe drivable area are the key enablers to speed up autonomous technology deployment. AI/machine learning technologies are widely used to process sensor data and provide what is needed for autonomous system to "see" the surrounding environment. But, AI/machine learning systems are slow and do not adapt readily to real-time changes in environmental conditions that affect sensor performance and can make a sensor's effective coverage smaller than its technical specification.

BRIEF DESCRIPTION OF THE DRAWINGS

Embodiments of the disclosure are illustrated by way of example and not limitation in the figures of the accompanying drawings in which like references indicate similar elements.

FIG. 10 illustrates, in block diagram form, an ADV sensor system's strengths and weaknesses, in combination, according to some embodiments.

DETAILED DESCRIPTION

Figure 1:
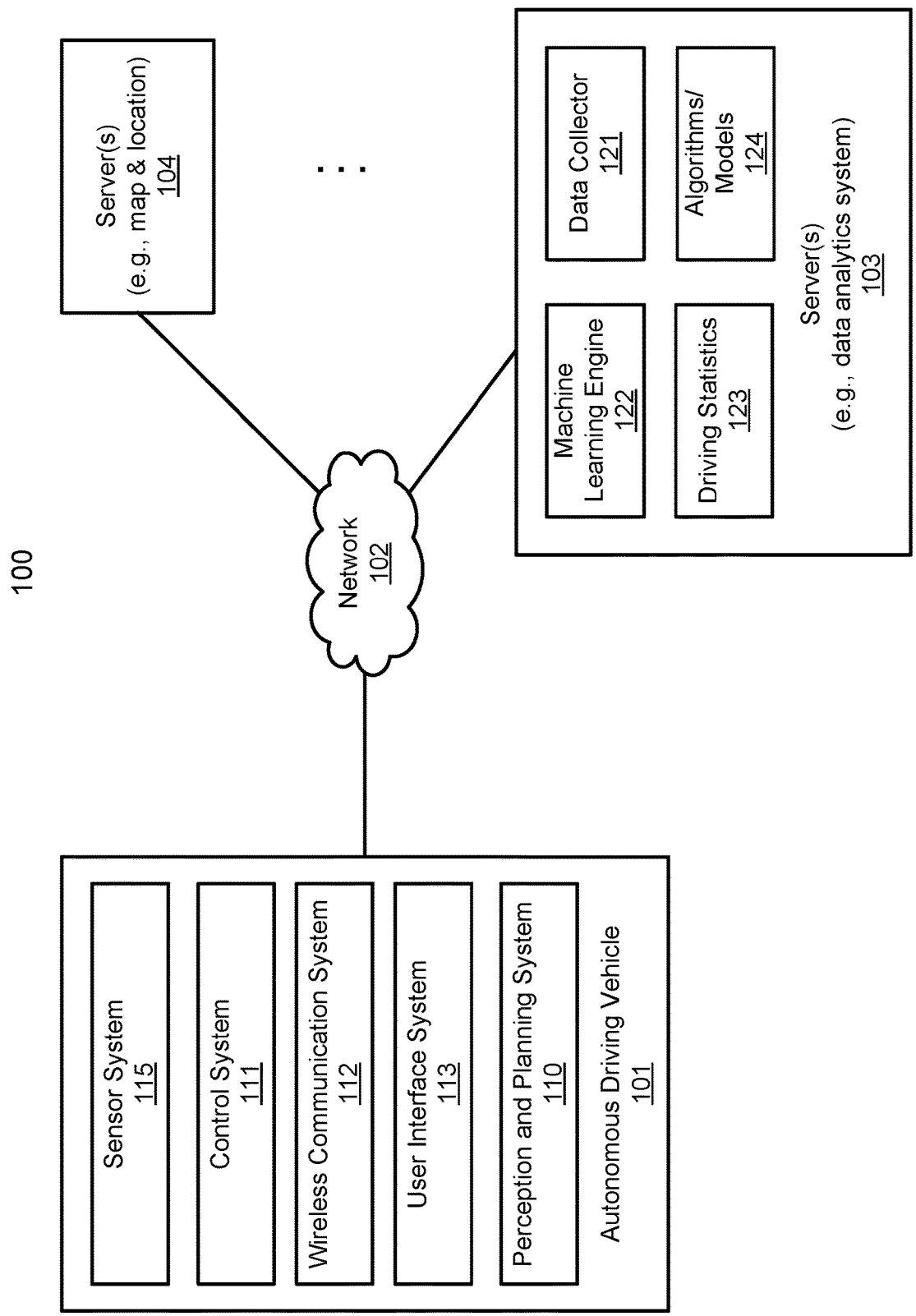
FIG. 1 is a block diagram illustrating a networked system according to one embodiment.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

In a first embodiment, a computer-implemented method of dynamically adjusting effective sensor coverage area of a first sensor in an autonomous driving vehicle (ADV) includes determining a location of the ADV with respect to a high-definition (HD) map and determining a list of one or more objects surrounding the ADV that the ADV will navigate to avoid. The list of one or more objects can include locating one or more objects using sensor data from a plurality of ADV sensors, or maintaining a list of one or more objects that include objects whose location has been verified and tracked, and/or objects whose location verification is pending. A first static object from first sensor data of the first sensor is located an identified. In response to determining that the identified first static object located and identified by the first sensor matches one of the one or more objects in the HD map, and in response to determining that the first static object is located outside of the effective sensor coverage coordinates of the first sensor, the effective sensor coverage coordinates of the first sensor are increased to include the location of the first static object. In response to determining that the first static object detected by the first sensor does not match any of the one or more objects in the HD map: the first static object can be located and identified from second sensor data of a second sensor. In response to determining that the first static object located and identified from the second sensor data is located inside the effective sensor coverage coordinates of the first sensor, the sensor effective coverage coordinates of the first sensor can be reduced to exclude the location of the first static object. In an embodiment, increasing the effective sensor coverage coordinates of the first sensor to include the location of the first static object can include setting the effective coverage coordinates to a default setting of the effective sensor coverage coordinates for the first sensor, such as a factory-default sensor coverage. In an embodiment, the first sensor can be a camera, a LIDAR sensor, or a RADAR system. In an embodiment, dynamically adjusted effective sensor coverage coordinates of the first sensor are stored in a memory in association with the first sensor. The effective sensor coverage coordinates of the first sensor can then be retrieved from the memory, prior to determining that the first static object is located outside of the effective sensor coverage coordinates of the first sensor. The ADV can be navigated to avoid objects in the list of one or more objects surrounding the ADV.

In a second embodiment, a computer-implemented method of safely navigating an autonomous driving vehicle (ADV) includes determining, by an ADV navigation system, a route to navigate the ADV that is based at least in part upon localizing the ADV in a high-definition (HD) map and determining a location and trajectory of a plurality of objects surrounding the ADV. The ADV is navigated along the route in response to a plurality of navigation control inputs from the ADV navigation system, such as steering, braking, and throttle inputs. One or more of the plurality of navigation control inputs is modified in response to one or more safety monitors of an ADV safety monitor system that is independent of the ADV navigation system. Modifying one or more of the plurality of navigation control inputs can including determining, by a localization safety monitor of the ADV safety monitor system, that a localization system of the ADV navigation system fails to correctly locate the ADV within the HD map and modifying one or more control inputs to stop the ADV. In an embodiment, modifying one or more of the plurality of navigation control inputs can include determining, by a sensor performance monitor of the ADV safety monitor system, that effective sensor coverage area of a sensor in a perception system of the ADV navigation system is too small for a current speed of the ADV and reducing a throttle input, and/or increasing a braking input, of the plurality of navigation control inputs, to reduce the current speed of the ADV. The method can further include receiving, from a perception system of the ADV navigation system, by a perception monitor of the ADV safety monitor system, a plurality of objects representing obstacles to the ADV along the route, generating, by a safety perception system of the ADV monitor system, a plurality of safety critical objects surrounding the ADV, and generating, by the safety perception system, a final list of safety critical objects along the safe driving route, from the plurality of objects received from the perception system and the plurality of safety critical objects generated by the safety perception system. Then, a safe path system of the ADV safety monitor system can determine a plurality of safe areas to navigate the ADV taking into account the final list of safety critical objects. In an embodiment, the method can further include receiving, by a planning monitor of the ADV safety monitor system, from a planning system of the ADV navigation system, the route to navigate the ADV, and comparing the received route with the plurality of safe areas to navigate. In response to determining that the route does not lie within the safe areas to navigate the method can also include generating a new route for the ADV to navigate that lies within the safe area and navigating the ADV along the new route. In an embodiment, the method can alternatively, or in addition, include receiving, by an automated system performance monitor of the ADV safety monitor system, the plurality of safe areas to navigate the ADV and the route to navigate the ADV, and instructing a control system of the ADV navigation to perform one of: executing the plurality navigation control inputs of the ADV navigation system, limiting at least one of the plurality of navigation control inputs of the ADV navigation system, or performing a fail-operational navigation of the ADV. In an embodiment, the fail-operational navigation of the ADV can include navigating the ADV to a location within the plurality of safe areas and stopping the ADV.

In a third embodiment, a computer-implemented method of operating an autonomous driving vehicle (ADV) includes receiving sensor data and effective sensor coverage coordinates for each of a plurality of sensors of a navigation system of the ADV. The effective sensor coverage coordinates for each sensor are based at least in part upon environmental conditions surrounding the ADV. The method further includes identifying a list of safety-critical objects from the sensor data. The safety-critical objects can include one or more static objects and one or more dynamic objects that are located inside drivable paths of the ADV. The method can also include receiving a list of objects perceived by a perception module in a navigation system of the ADV. For each safety-critical object in list the safety-critical objects, the method searches the received list of objects perceived by the perception module to find the safety-critical object. In response to determining that the safety-critical object is not found within the received list of objects perceived by the perception module, (1220), the method performs a fail-operational action to navigate the ADV. Environmental conditions can include one or more of: daylight, darkness, weather (e.g. snow, rain, fog), or debris (dust, wind-carried objects, dirt on sensors, etc). In an embodiment, safety-critical objects also include one or more dynamic objects that are currently located in a second area, outside of drivable paths of the ADV, and located inside a range of interest (ROI) such that one or the one or more dynamic objects could later intercept a drivable path of the ADV. Dynamic objects are objects that are moving, such as people and cars, and static objects are objects that are not moving, such as buildings, trees, parked cars, etc. The method can also include determining a list of one or more safe drivable areas within a high-definition (HD) map that includes a current vehicle path for the ADV, wherein a safe drivable path for the ADV takes one or more static objects and one or more dynamic objects in the safety-critical list into account. The method can further include refining the list of one or more safe drivable areas by further taking into account one or more dynamic objects that are not currently within one of the one or more safe drivable areas, and the one or more dynamic objects could later intercept the one of the one or more drivable areas. In an embodiment, the method can include receiving, by a safety plan monitor, from a planning module of the navigation system of the ADV, a current planned trajectory for the ADV and determining whether the current planned trajectory is within the list of one or more safe drivable areas. If not, the method performs a fail-operational action to navigate the ADV. A safe drivable area can include one or more of a roadside, a parking space, or location other than a driving lane.

In a fourth embodiment, any of the above methods can be performing by a processing system having at least one hardware processor, and a memory programmed with executable instructions that, when executed by the processing system, perform the operations of the methods.

In a fifth embodiment, any of the above methods can be implemented with executable instructions programmed onto a non-transitory computer readable medium, such as a memory or storage. When the executable instructions are executed by a processing system having at least one hardware processor, the processing system causes the method operations to be performed.

FIG. 1 is a block diagram illustrating an autonomous vehicle network configuration according to one embodiment of the disclosure. Referring to FIG. 1, network configuration 100 includes autonomous vehicle 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) servers, or location servers, etc.

An autonomous vehicle refers to a vehicle that can be configured to in an autonomous mode in which the vehicle navigates through an environment with little or no input from a driver. Such an autonomous vehicle can include a sensor system having one or more sensors that are configured to detect information about the environment in which the vehicle operates. The effective coverage range of the sensors can be dynamically configured based upon environmental conditions surrounding the autonomous vehicle. Environmental conditions can include whether the environment is dark (may limit camera operation), excessively bright (may limit camera contrast), snowing or raining (which may affect camera or LIDAR range), dust or dirt on one or more sensors, and the like. The vehicle and its associated controller(s) use the detected information to navigate through the environment. Autonomous vehicle 101 can operate in a manual mode, a full autonomous mode, or a partial autonomous mode.

In one embodiment, autonomous vehicle 101 includes, but is not limited to, perception and planning system 110, vehicle control system 111, wireless communication system 112, user interface system 113, infotainment system 114, and sensor system 115. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
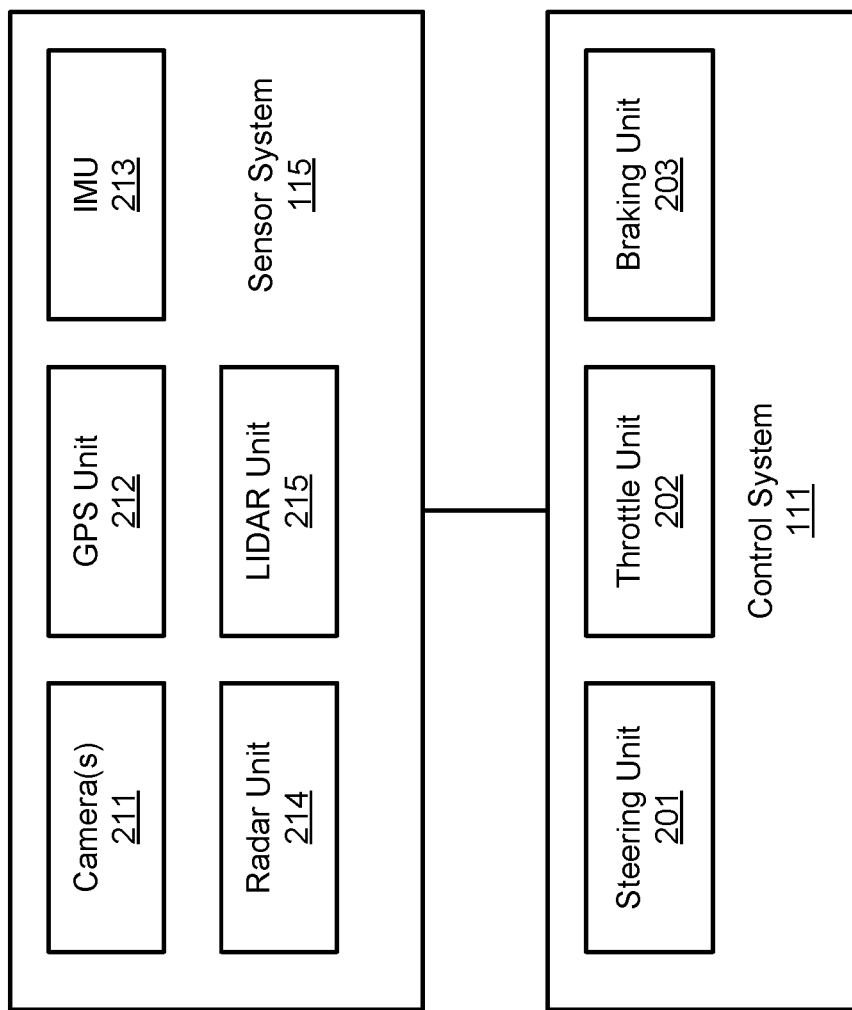
FIG. 2 is a block diagram illustrating an example of an autonomous vehicle according to one embodiment.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform. The effective coverage range of one or more sensors can be dynamically configured based upon environmental conditions surrounding the autonomous vehicle. Environmental conditions can include whether the environment is dark (may limit camera operation), excessively bright (may limit camera contrast), snowing or raining (which may affect camera or LIDAR range), dust or dirt on one or more sensors, and the like.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn control the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyboard, a touch screen display device, a microphone, and a speaker, etc.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111.

For example, a user as a passenger may specify a starting location and a destination of a trip, for example, via a user interface. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110.

While autonomous vehicle 101 is moving along the route, perception and planning system 110 may also obtain real-time traffic information from a traffic information system or server (TIS). Note that servers 103-104 may be operated by a third party entity. Alternatively, the functionalities of servers 103-104 may be integrated with perception and planning system 110. Based on the real-time traffic information, MPOI information, and location information, as well as real-time local environment data detected or sensed by sensor system 115 (e.g., obstacles, objects, nearby vehicles), perception and planning system 110 can plan an optimal route and drive vehicle 101, for example, via control system 111, according to the planned route to reach the specified destination safely and efficiently. In the event that an effective sensor coverage area of one or more sensors becomes limited, temporarily or otherwise, by environmental conditions surrounding the autonomous vehicle, one or more safety monitors of a safety system may be engaged to limit operation of the autonomous vehicle to ensure vehicle safety. For example, if a GPS system is not available, and an effective sensor coverage area of a LIDAR system becomes dynamically reduced based on the environment surrounding the autonomous vehicle, a localization system of the autonomous vehicle may not be able to determine a location of the autonomous vehicle within a high-definition (HD) map. In such case, safety monitor(s) may detect the loss of localization capability and perform a fail-operational action to safely navigate the autonomous vehicle to a stop at a side of a roadway.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either autonomous vehicles or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc.

Based on driving statistics 123, machine learning engine 122 generates or trains a set of rules, algorithms, and/or predictive models 124 for a variety of purposes. In one embodiment, algorithms 124 may include using a combination of an HD map and one or more sensors to anticipate certain types of environmental changes that may affect safe vehicle navigation. For example, driving statistics may indicate specific locations or areas within an HD map where a GPS location service may be lost, based upon buildings existing within the area. Driving statistics may further indicate locations where a real-time kinematic (RTK) system exists in an HD map. Driving statistics may further indicate dates or times of year when certain weather conditions may affect effective sensor coverage area (such as snow, hail, or rain). These, and other, driving statistics 123 can be uploaded to a server 103, for processing by machine learning engine 122 to generate effective sensor coverage models that may assist safety monitors of the autonomous vehicle in anticipating locations, seasons, and/or conditions that may affect the autonomous vehicle's sensor system, and therefore, may affect safe navigation of the autonomous vehicle.

Algorithms 124 can then be uploaded on ADVs to be utilized during autonomous driving in real-time.

Figure 3:
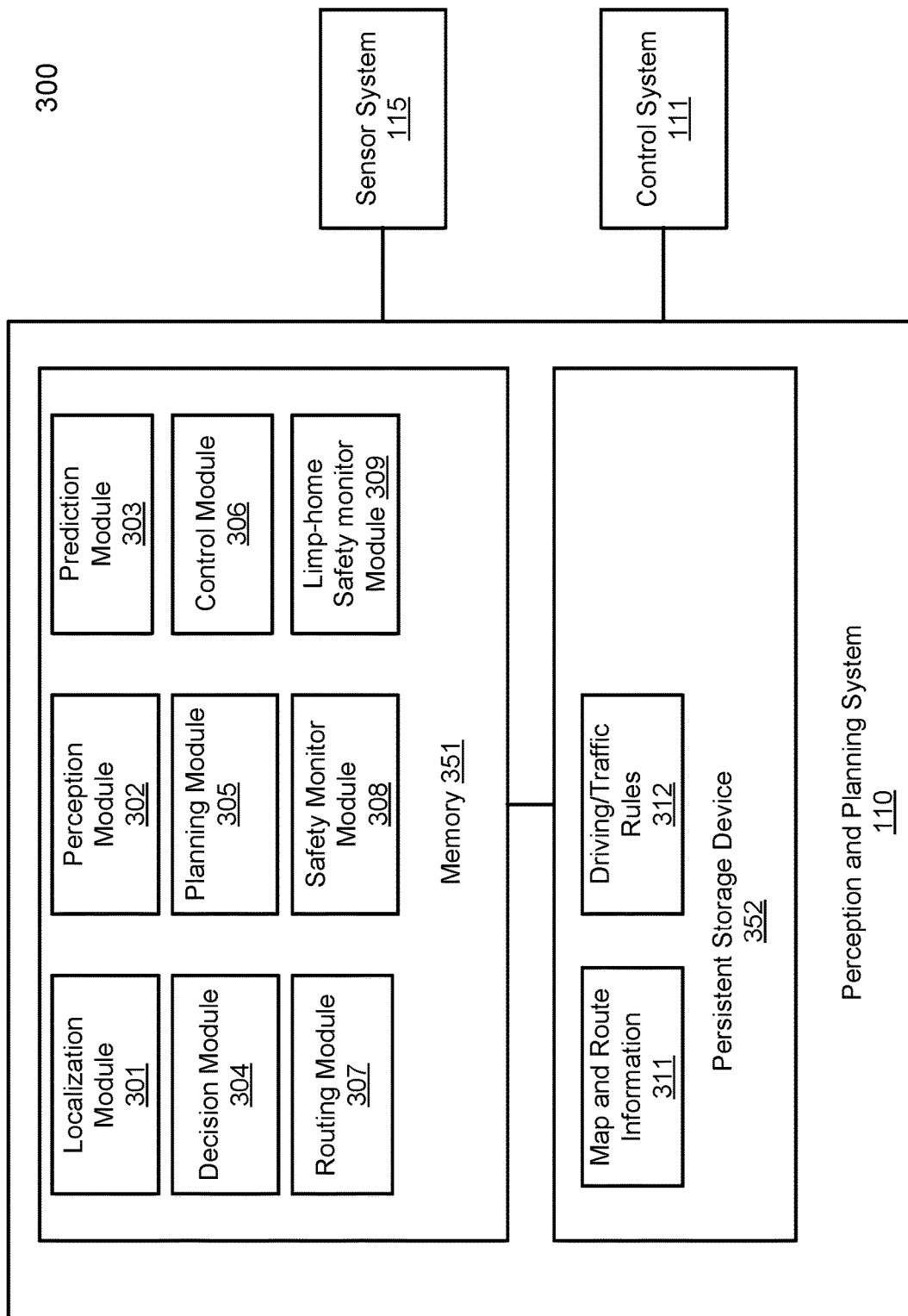
FIG. 3 is a block diagram illustrating an example of a perception and planning system used with an autonomous vehicle according to one embodiment.

FIG. 3 is a block diagrams illustrating an example of a perception and planning system 110 used with an autonomous vehicle according to one embodiment. System 300 may be implemented as a part of autonomous vehicle 101 of FIG. 1 including, but is not limited to, perception and planning system 110, control system 111, and sensor system 115. Referring to FIG. 3, perception and planning system 110 includes, but is not limited to, localization module 301, perception module 302, prediction module 303, decision module 304, planning module 305, control module 306, routing module 307, safety monitor module 308, and limp-home safety monitor module 309.

Some or all of modules 301-309 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-309 may be integrated together as an integrated module.

Localization module 301 determines a current location of autonomous vehicle 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of autonomous vehicle 300, such as map and route information 311, to obtain the trip related data. For example, localization module 301 may obtain location and route information from a location server and a map and POI (MPOI) server. A location server provides location services and an MPOI server provides map services and the POIs of certain locations, which may be cached as part of map and route information 311. While autonomous vehicle 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration, traffic light signals, a relative position of another vehicle, a pedestrian, a building, crosswalk, or other traffic related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 302 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts what the object will behave under the circumstances. The prediction is performed based on the perception data perceiving the driving environment at the point in time in view of a set of map/rout information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Performance of the perception module 302 may rely upon performance of one or more sensors in sensor system 115. Sensor performance may be affected by an environment surrounding the autonomous vehicle. For example, performance of a camera may be affected by excessive sunlight or darkness. LIDAR performance may be affected by particulate matter such as snow, rain, hail, or debris. Dirt built-up on, e.g., a camera or LIDAR system, may reduce an effective sensor coverage area (which can be expressed in coordinates) of the sensor. Effective sensor coverage area can be dynamically adjusted based upon changes in environmental conditions surrounding the autonomous vehicle. Safety monitor module 308 can include logic to determine, and dynamically adjust, effective sensor coverage area. If safety monitor module 308 determines that effective sensor coverage has degraded too much, a limp-home safety monitor module 309 can take a fail-operational action to safely stop the autonomous vehicle.

Routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 304 and/or planning module 305. Decision module 304 and/or planning module 305 examine all of the possible routes to select and modify one of the most optimal routes in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

Based on a decision for each of the objects perceived, planning module 305 plans a path or route for the autonomous vehicle, as well as driving parameters (e.g., distance, speed, and/or turning angle), using a reference line provided by routing module 307 as a basis. That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/path segment). For example, the planning and control data may instruct vehicle 300 to move 10 meters at a speed of 30 mile per hour (mph), then change to a right lane at the speed of 25 mph.

Based on the planning and control data, control module 306 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, steering commands) at different points in time along the path or route.

In one embodiment, the planning phase is performed in a number of planning cycles, also referred to as driving cycles, such as, for example, in every time interval of 100 milliseconds (ms). For each of the planning cycles or driving cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the autonomous vehicle. For example, the navigation system may determine a series of speeds and directional headings to affect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps so as to determine the driving path for the autonomous vehicle.

Safety monitor module 308 can include a localization monitor, a sensor performance monitor, a safety perception module, a perception monitor, a define safe path module, a planning monitor, and an automated system performance monitor, as described more fully, below, with reference to FIG. 4. Safety monitor module 308 can receive information from modules 301-307, described above, to ensure that the autonomous vehicle navigates along a safe path, even if the performance of one or more sensors degrades. Modules 301-307, above, perform primary automated navigation along a path determined by planning module 305. Modules 301-307, above, rely upon one or more sensors to provide low-noise signals, up to a design criteria specification, to identify potential objects that may be, or become, obstacles to navigating the autonomous vehicle along a route in accordance with traffic laws while maximizing the comfort of passengers in the autonomous vehicle. Safety monitor module 308 finds one or more safe driving areas to navigate the autonomous driving vehicle when sensor performance may temporarily degrade due environmental changes surrounding the autonomous vehicle. The safe driving areas determined by safety monitor module 308 may, or may not, comply with traffic laws and may not maximize passenger comfort.

Limp-home safety monitor 309 utilizes information received from sensors 115, localization module 301, perception module 302, and planning module 305, and various safety monitors within the safety monitor module 308, to determine a safe driving path, within the safe driving areas found by the safety monitor module 308, to perform a fail-operational action in view the effective sensor coverage area determined by safety monitor module 308.

Figure 4:
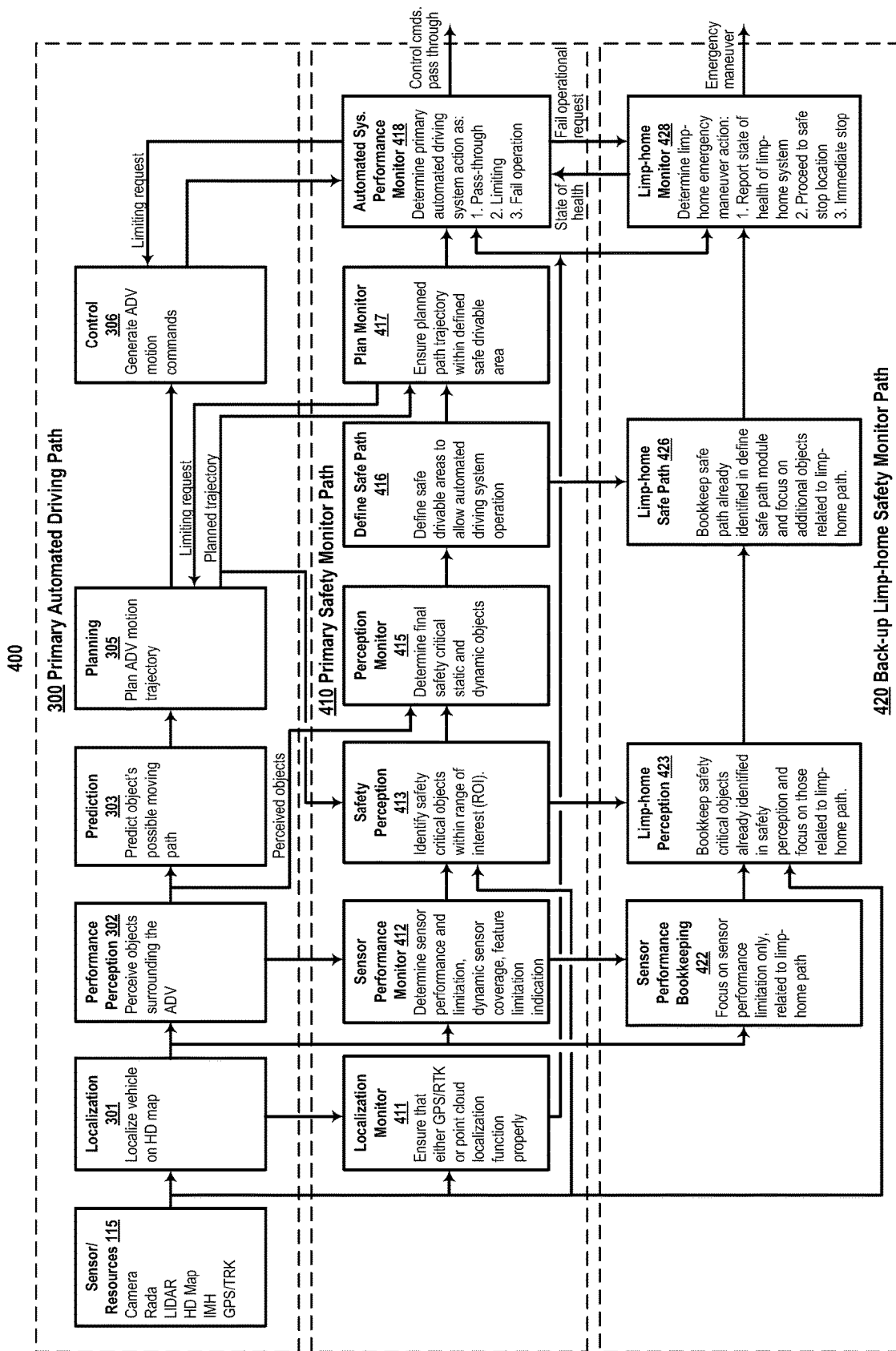
FIG. 4 is a block diagram illustrating a system for a fail-operational ADV driving system with safety monitors, safe drivable area determination, and effective sensor coverage determination, according to some embodiments.

FIG. 4 is a block diagram illustrating a system for a fail-operational ADV driving system 400 with safety monitors, safe drivable area determination, and effective sensor coverage determination, according to some embodiments. The fail-operational ADV driving system 400 includes a primary automated driving path (flow of logic) 300, a primary safety monitor path 410, and a back-up limp-home safety monitor 420.

Primary automated driving path 300 includes sensors 115, a localization module 301, performance perception module 302, a prediction module 303, a planning module 305, and a control module 306. Sensors 115 and modules 301 through 303, 305, and 306 are described above with reference to FIGS. 2 and 3. Recapping here, localization module 301 determines a location of the autonomous vehicle with reference to a high-definition (HD) map. The HD map contains numerous static objects, such as building, trees, traffic signals or signs, and other static objects. The HD map, in conjunction with sensors system 115, can determine the location of the autonomous vehicle with respect to the HD map. Performance perception 302 receives the location of the ADV from localization module 301 and further receives sensor data from sensors of sensor system 115. Performance perception 302 (so-named to distinguish performance perception from safety perception) can determine one or more static (non-moving) and/or dynamic (moving) objects surrounding the ADV location from the sensor data. Prediction module 303 can receive a list of objects from performance perception module 302, along with additional sensor data, to determine which objects in the list are dynamic (moving) objects and to predict a direction which each dynamic object in the list of objects may be moving. Planning module 305 can receive the list of static and dynamic objects, and the predicted trajectories of dynamic objects, from prediction module 303. Planning module 305 then determines a route to navigate the ADV, in view of the static and dynamic objects and their predicted trajectories. Planning module 305 can pass the planned route (trajectory) to navigate to the control module 306 which generates appropriate control signals for throttle, brake, or steering to navigate the ADV along the route. Primary automated driving path 300 generates the route in accordance with traffic laws and logic that ensures passenger comfort.

Primary safety monitor path (flow of logic) 410 includes a plurality of monitors that perform a variety of safety checks on the primary automated driving path 300 system. Primary safety monitor 410 includes a monitor that dynamically determines, and adjusts, the effective sensor coverage area of sensors in sensor system 115. An effective sensor coverage area for a sensor is distinct from, and often less than, a design specification coverage area for a particular sensor. As environmental conditions surrounding the ADV change, the effective sensor coverage area of one more sensors can be dynamically adjusted based on the environmental conditions.

Safety monitors in the primary safety monitor 410 include a localization monitor 411, a sensor performance monitor 412, a safety perception module 413 (distinct from the performance perception module 302), a perception monitor 415, a define safe path module 416, a planning monitor 417, and an automated system performance monitor 418.

Localization monitor 411 ensures that either a global positioning satellite (GPS) system and, optionally, a real-time kinematic (RTK) system, or a point cloud generated from sensor data (e.g. camera, LIDAR, and/or RADAR), correctly localizes the ADV with respect to an HD map. A GPS signal may be lost in city driving, e.g. between tall buildings or when driving through a tunnel, or other time when line-of-sight with a satellite positioning system is impaired. An RTK system may be used to augment or substitute for GPS, or increase the accuracy of GPS, but RTK may also not be available. In the event of loss of GPS/RTK, a point cloud of sensor data from a LIDAR or RADAR device, possibly augmented by camera data, may be used in conjunction with an HD map to locate the ADV. If GPS/RTK fails or is unavailable, and effective sensor coverage area of one or more sensors, e.g. LIDAR, RADAR, or camera, has degraded (e.g. due to environment, such as rain or snow) to a point where the ADV cannot be localized with respect to the HD map, then the back-up limp-home system 420 may be activated to perform a fail-operational emergency stop. In the event that the ADV cannot be localized within the HD map, localization monitor 411 can notify automated system performance monitor 418 and limp-home monitor 428 that the ADV cannot be localized within the HD map. Automated system performance monitor 418 and limp-home monitor 428 are both described below.

Sensor performance monitor 412 can receive a list of static objects, obtained from the HD map, that surround the ADV and are near to, or on, the route that the ADV will navigate. Sensor performance monitor 412 can determine, for each sensor in sensor system 115, an effective sensor coverage area for the sensor based upon current environmental conditions surrounding the ADV. The effective sensor coverage area may be different from, and often less than, the design specification sensor coverage area for the sensor. Sensor performance monitor 412 can retrieve, from a storage or memory, a current sensor coverage area for each sensor. Current sensor coverage area can be the design specification sensor coverage area or an effective sensor coverage area that is dynamically adjusted based on environmental conditions surrounding the ADV. Sensor data can be read from a sensor. In an embodiment, sensor data for the sensor can be received from performance perception module 302. For each distinguishable static object within the sensor data, the features of the object and identification of the object can be extracted from the sensor data. If the identified object is correctly located in the HD map, by correlating the distinguishable static object to a static object in the HD map, and the located and identified object is outside of the effective sensor coverage area for the sensor, then the effective sensor coverage area for the sensor can be increased at least to an area that includes the located and identified object. If the distinguishable static object within the sensor data cannot be correctly located within the HD map, and another sensor correctly locates the distinguishable static object in the HD map, and the distinguishable static object is inside the current sensor's effective sensor coverage area, then the current sensor's effective sensor coverage area can be reduced by at least an amount to exclude the distinguishable static object. The dynamically adjusted effective sensor coverage for the sensor can then be stored for later retrieval and use.

Safety perception module 413 can identify safety-critical objects within a range of interest (ROI) around the ADV. Safety-critical objects are those static (non-moving) and/or dynamic (moving) objects that are on, or near, a planned route of the ADV (i.e. in the ROI). Safety-critical objects also can include dynamic objects that are outside of the ROI, but are predicted to move in a direction that may intercept the planned route of the ADV. Safety perception module 413 can build the list of safety-critical objects from localization data received from localization monitor 411, effective sensor coverage area information received from sensor performance monitor 412, and the HD map. Safety perception module 413 determines the list of safety-critical objects in preparation for determining safe drivable areas for the ADV.

Perception monitor 415 can receive the list of safety-critical objects from safety perception module 413. Perception monitor 415 can make a final list of static and dynamic safety-critical objects with which safe drivable areas can be determined. Dynamic objects can include moving objects that are within the region of interest of the ADV path, and those dynamic objects that are outside the region of interest but may intercept the region of the ADV path based upon a predicted trajectory for the dynamic objects.

Define safe path module 416 can receive the final list of safety-critical objects from perception monitor 415. Define safe path module 416 can locate areas surrounding the ADV that the ADV can use to perform fail-operational actions. Safe drivable areas for the ADV can include additional areas that are not considered by the planning module 305, which must follow traffic rules and passenger comfort considerations. Safe driving areas are areas where the ADV may navigate safely, independent of traffic rules and passenger comfort. Safe drivable areas are areas where the ADV will avoid safety-critical objects, independent of the navigation route planned by the planning module 305.

Plan monitor 417 can receive the planned navigation route (trajectory) from the planning module 305. Plan monitor also receives the list of safe drivable areas from define safe path module 416. Plan monitor 417 can determine whether the planned navigation route (trajectory) falls within the safe driving areas determined by define safe path module 416. If the planned trajectory does not fall within the safe driving areas, then the plan monitor 417 can send a limiting request to planning module 305, warning the planning module 305 that the ADV is, or is about to be, outside of the safe drivable areas that were determined by the define safe path module 416. In response to the warning and limiting request, planning module 305 may modify the planned trajectory for the ADV and transmit the modified trajectory to control module 306. Final arbitration of a navigation action to take is handled by the automated system performance monitor 418.

Automated system performance monitor 418 can receive the warning and limiting request that the plan monitor 417 issued to the planning module 305, notifying planning module 305 that the ADV is, or is about to be, outside of the safe drivable areas that were determined by the define safe path module 416. Automated system performance monitor 418 can also receive, from localization monitor 411, an indication as to whether the ADV is able to be localized (located) within the HD map. Automated system performance monitor 418 can receive a list of control commands, generated by control module 306, for navigating the ADV along the route path generated by the planning module 305, and as may be modified by the planning module 305 in response to a limiting request from the plan monitor 417. In addition, automated system performance monitor 418 receives a state of health of the ADV navigation system from limp-home monitor 428. Limp-home monitor 428, and other modules of the back-up limp-home system 420 are described below. From the above received information, automated system performance monitor 418 determines whether to (1) allow the control commands (throttle, braking, and steering) received from the control module 306 to pass through to execution, (2) send a limiting request to the control module 306 to modify one or more of the throttle, steering, or braking commands so that the ADV navigates within the safe drivable areas, or (3) send a fail-operational signal to the limp-home monitor 428.

Back-up limp-home safety monitor path (logic flow) 420 can include a sensor performance bookkeeping module 422, a limp-home perception module 423, a limp-home safe path module 426, and a limp-home monitor 428.

Sensor performance bookkeeping module 422 stores the current effective coverage area (coordinates) for each sensor in sensor system 115. Sensor performance bookkeeping module 422 can receive vehicle localization information from localization module 301, and store an indicator as to whether the ADV is able to be localized within the HD map. Sensor performance bookkeeping module 422 can also receive effective sensor coverage area information for each sensor in sensor system 115 from sensor performance monitor 412. Sensor performance bookkeeping module 422 can correlate effective sensor coverage area for each sensor with each other sensor to determine an overall sensor system 115 effective sensor coverage map and functionality. Sensor performance bookkeeping module 422 can pass, or otherwise map available (e.g. with a pointer or reference) the effective sensor coverage map to the limp-home perception module 423.

Limp-home perception module 423 stores (bookkeeps) safety-critical objects already identified in safety perception module 413 and focuses on those objects related to a limp-home, fail-operational path. Limp-home perception module 423 can receive sensor data from sensor system 115. Limp-home perception module 423 can also receive the effective sensor coverage area for each sensor, and/or the effective sensor coverage map for all sensors, from sensor performance bookkeeping module 422. Limp-home perception module 423 can also receive a list of safety-critical objects within the range of interest (ROI) of the ADV from safety perception module 413. Limp-home perception module 423 may further reduce the list of safety-critical objects to those objects that may relate to the safe drivable areas identified by define safe path module 416. Limp-home perception module 423 can pass the final list of safety-critical objects to limp-home safe path module 426.

Limp-home safe path module 426 stores (bookkeeps) a safe path already identified in define safe path module 416 and focuses on the safety-critical objects related to the limp-home path. Limp-home path receives the final list of safety-critical objects from limp-home perception module 423. Limp-home safe path module 426 also receives the list of safe drivable areas from plan monitor module 417. From the received information, limp-home safe path module 426 determines one or more limp-home safe driving paths that can be readily implemented as a fail-operational action.

Limp-home monitor 428 determines a limp-home emergency maneuver action (fail-operational) to take. A limp-home emergency maneuver action can include one of: (1) report a state of health of the back-up limp-home safety monitor path 420 to the automated system performance monitor 418; (2) proceed to a safe stop location; or (3) perform an immediate stop. A state of health of the back-up limp-home safety monitor path 420 can include any of the stored data described above, including whether the ADV can be localized within the HD map, an effective sensor coverage area of each sensor and/or an overall effective sensor coverage map stored by the sensor performance bookkeeping module 422, a list of safety-critical objects related to the location and route of the ADV within a region of interest stored by the limp-home perception module 423, and one or more safe drivable paths determined by the limp-home safe path module 426. Limp-home monitor can receive a fail-operational request from automated system performance monitor 418. If a fail-operational request is received by limp-home monitor 428, then limp-home monitor 428 can perform logic that executes an emergency maneuver: (2) proceeding to a safe stop location; or (3) performing an immediate stop of the ADV.

Figure 5A:
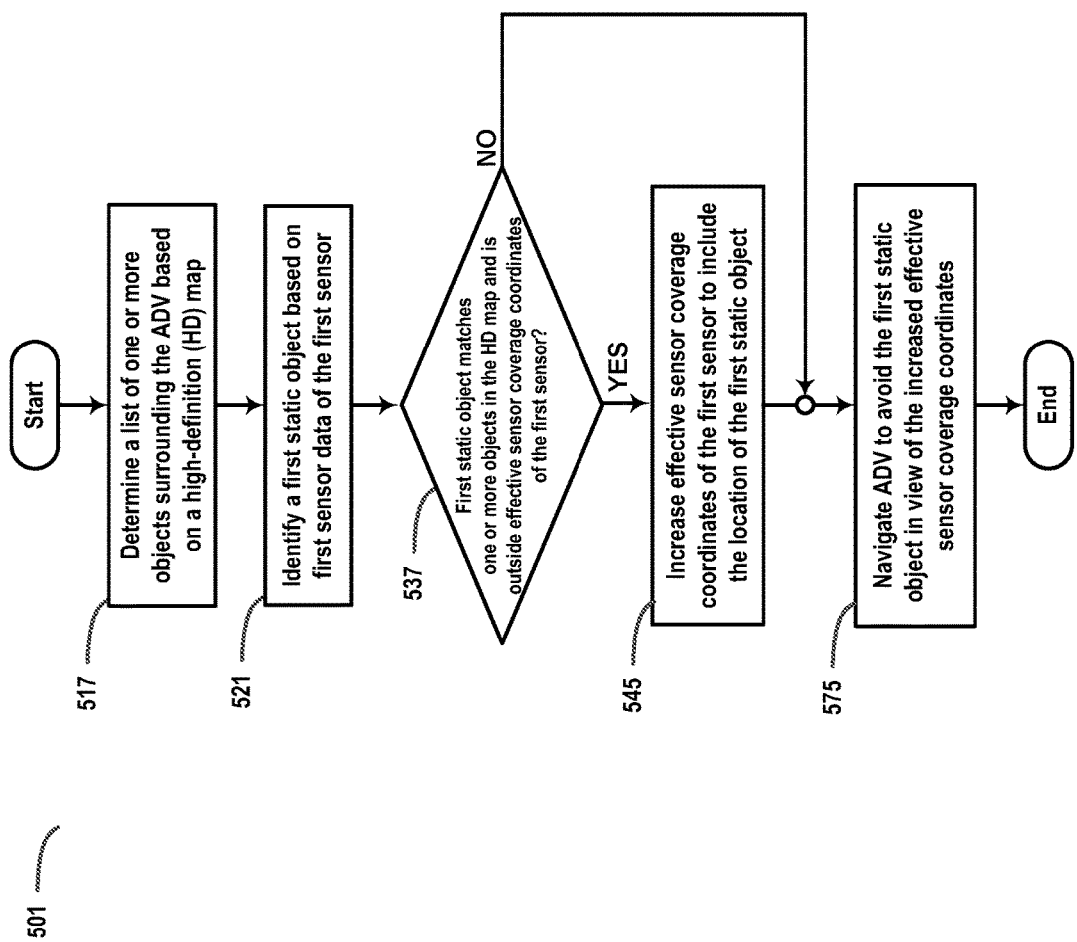
FIG. 5A illustrates, in block diagram form, a method of determining effective sensor coverage area in an autonomous driving system, using a high-definition (HD) map and sensors, according to some embodiments.

FIG. 5A illustrates, in block diagram form, a method 501 of determining effective sensor coverage area in an autonomous driving system, using a high-definition (HD) map and sensors, according to some embodiments.

Referring to FIG. 5A, in operation 517, a list of one or more objects surrounding the ADV is determined, based upon an HD map. In an embodiment, the list of one or more objects is determined by the ADV perception and planning module system 110 and passed to sensor performance monitor 412. In an embodiment, the list of one or more objects is determined by sensor performance monitor 412.

In operation 521, a first static object is determined, based on sensor data of a first sensor in sensor system 115. The first sensor has an effective sensor coverage area (coordinates).

In operation 537, it can be determined whether the first static object matches one or more objects in the HD map and a location of the first static object is located of outside the first sensor's effective sensor coverage coordinates. If so, then method 501 continues at operation 545, otherwise method 501 continues at operation 575.

In operation 545, the effective sensor coverage coordinates of the first sensor are increased to include the first static object.

In operation 575, the ADV is navigated to avoid the first static object in view of the increased effective sensor coverage coordinates of the first sensor.

Figure 5B:
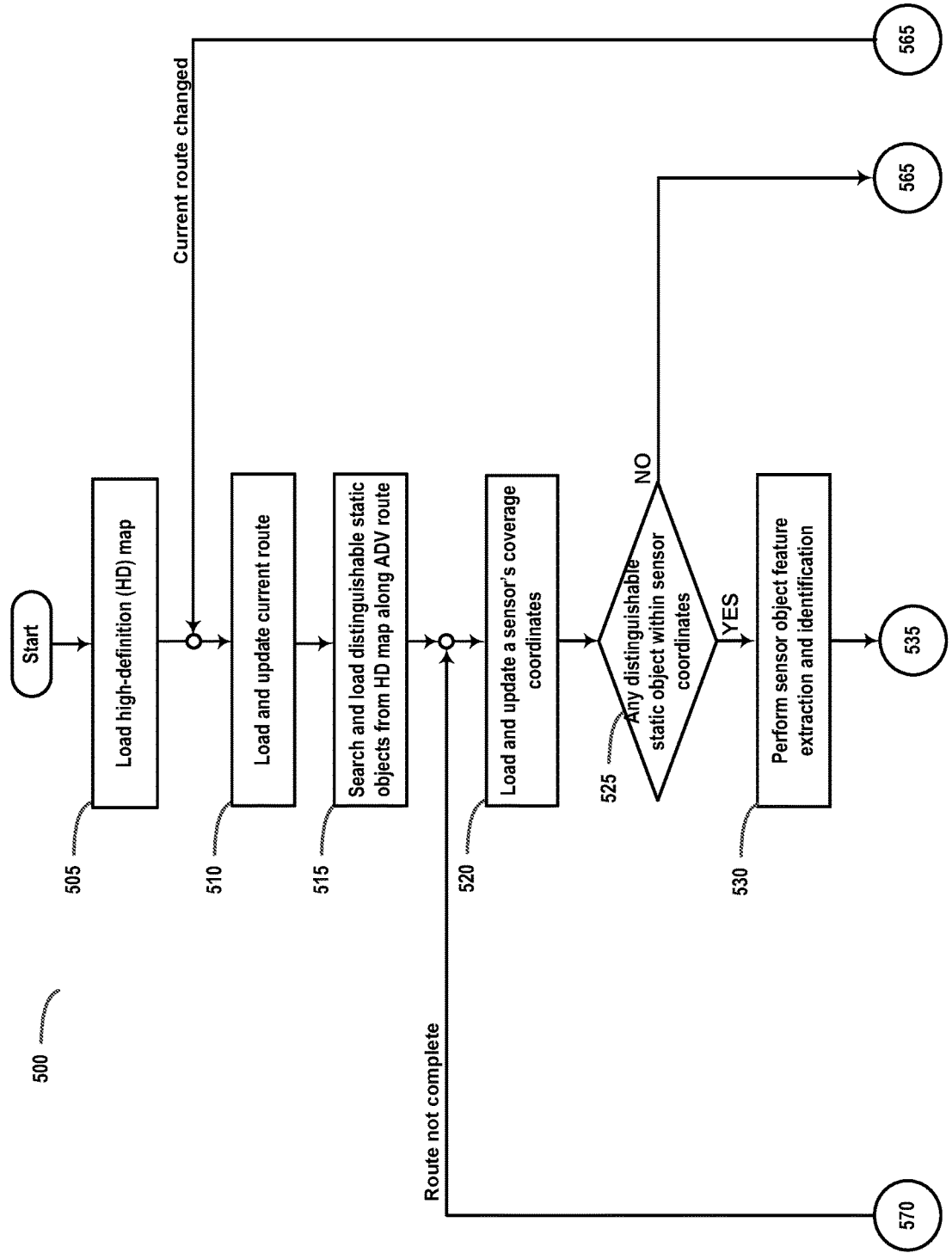
FIGS. 5B and 5C illustrate, in block diagram form, a method of determining effective sensor coverage area in an autonomous driving system, using a high-definition (HD) map and sensors, according to some embodiments.
Figure 5C:
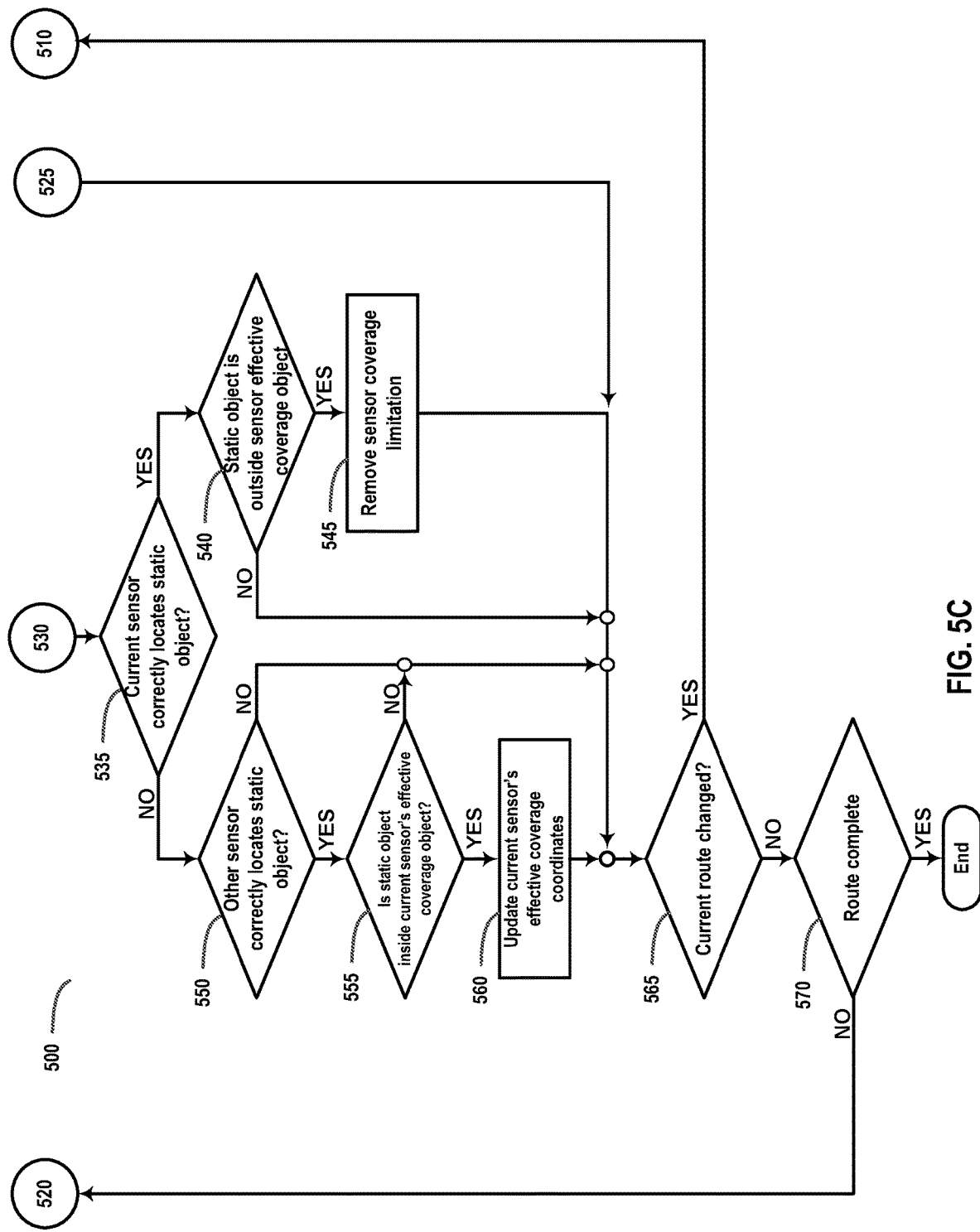

FIGS. 5B and 5C illustrate, in block diagram form, a method 500 of determining effective sensor coverage in an autonomous driving system using a high-definition (HD) map and sensors, according to some embodiments. Method 500 can be implemented by sensor performance monitor 412, as described above. In method 500, the effective sensor coverage of a current sensor is tested using static objects within an HD map and verified with another sensor, to determine whether the current sensor effective sensor coverage area needs to be adjusted, based on changes in environmental conditions surrounding the ADV and sensors.

Referring now to FIG. 5B, in operation 505, the high-definition (HD) map of the area surrounding the ADV can be loaded into memory. In an embodiment, the HD map may already be loaded by localization module 301 and can be referenced without reloading the HD map.

In operations 510, the current ADV route can be loaded and updated. Update may include updating the ADV location along the route and initiating a read of one or more sensors. Update may further include changes to the route by the planning module 305.

In operation 515, the HD map is searched for static objects that are along the ADV route. A list of static objects from the HD map is generated.

In operation 520, the current effective sensor coverage area (coordinates) for a sensor is loaded from memory, if not already in memory. The sensor data for the sensor read from the sensor, or is loaded from memory, if already read.

In operation 525, it is determined whether there is a distinguishable static object within the sensor data of the sensor. If so, then method 500 continues at operation 535, otherwise method 500 continues at operation 565.

In operation 530, the features of the distinguishable static object are extracted from the sensor data of the sensor.

Referring to FIG. 5C, in operation 535, it is determined whether the distinguishable static object identified from the sensor data correctly locates a corresponding static object in the list of static objects obtained from the HD map. If so, then method 500 continues at operation 540, otherwise method 500 continues at operation 550.

In operation 540, it is determined with the distinguishable static object identified in the sensor data and correctly located in the HD map is outside the effective sensor coverage area (coordinates) for the sensor. If so, then method 500 continues at operation 545, otherwise method 500 continues at operation 565.

In operation 545, the effective sensor coverage area for the sensor is increased (i.e., a limitation on the sensor coverage is removed) to at least an area that includes the correctly located static object in the HD map. Method 500 continues at operation 565.

In operation 550, it is determined whether another sensor correctly locates the static object that was identified in the current sensor data, but was not correctly located within the HD map in operation 535. If the other sensor correctly locates the static object that was identified in the current sensor data but was not correctly located within the HD map, then method 500 continues at operation 555, otherwise method 500 continues at operation 565.

In operation 555, it is determined whether the static object that identified by the current sensor, but was not correctly located within the HD map, is inside the current sensor's effective coverage area. If so, then method 500 continues at operation 560, otherwise method 500 continues at operation 565.

In operation 560, the distinguishable static object extracted from the sensor data of the current sensor was not corrected located within the HD map, another sensor has verified that the static object is in the HD map, and the static object is located inside the current sensor's effective coverage area. Accordingly, the effective sensor coverage area of the current sensor is reduced to at least an area that excludes the static object identified in the sensor data of the current sensor but was not correctly located within the HD map.

In operation 565, it can be determined whether the current ADV route has changed. If so, then method 500 continues at operation 510 of FIG. 5B. Otherwise method 500 continues at operation 570.

In operation 570, it can be determined whether the ADV route has been completed. If so, then method 500 ends, otherwise method 500 continues at operation 520 on FIG. 5B.

Operations 520 through 565 can optionally be repeated for additional objects found within a sensor's sensor data, or for additional sensors in sensor system 115.

Figure 6A:
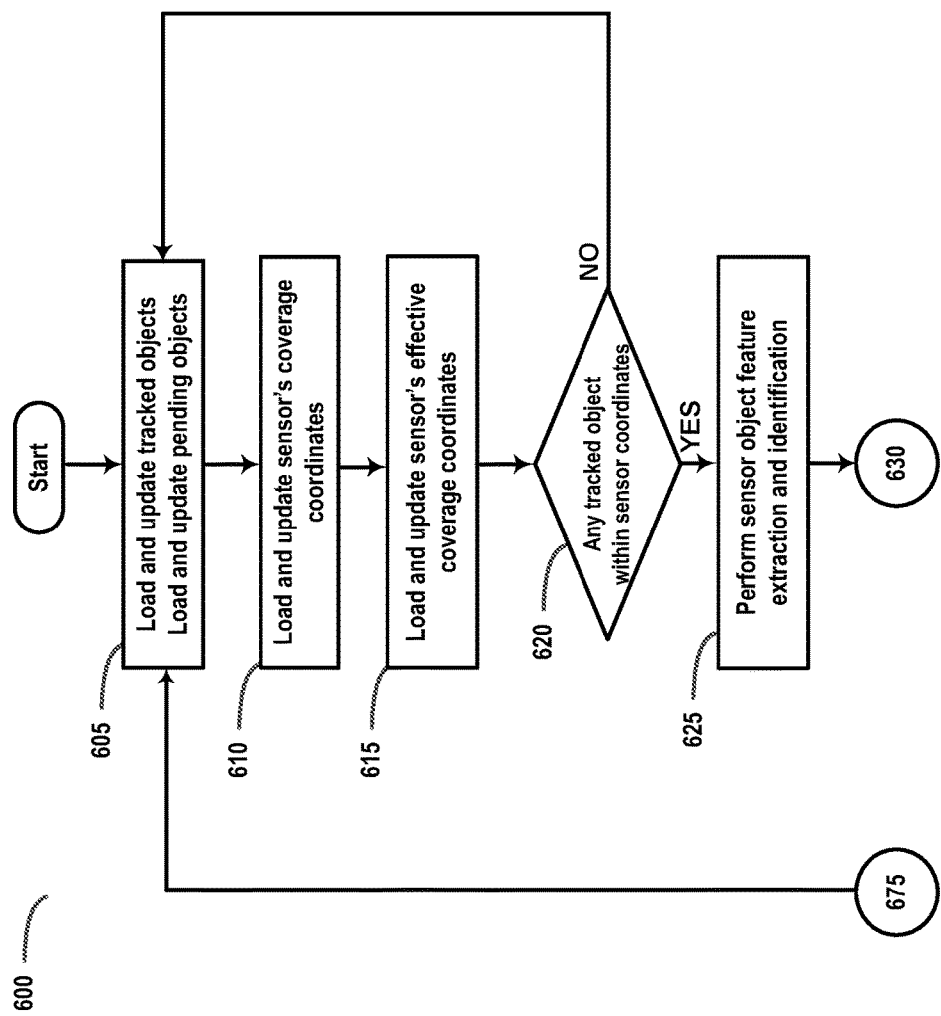
FIGS. 6A and 6B illustrate, in block diagram form, a method of determining effective sensor coverage area in an autonomous driving system, using object tracking and sensors, according to some embodiments.
Figure 6B:
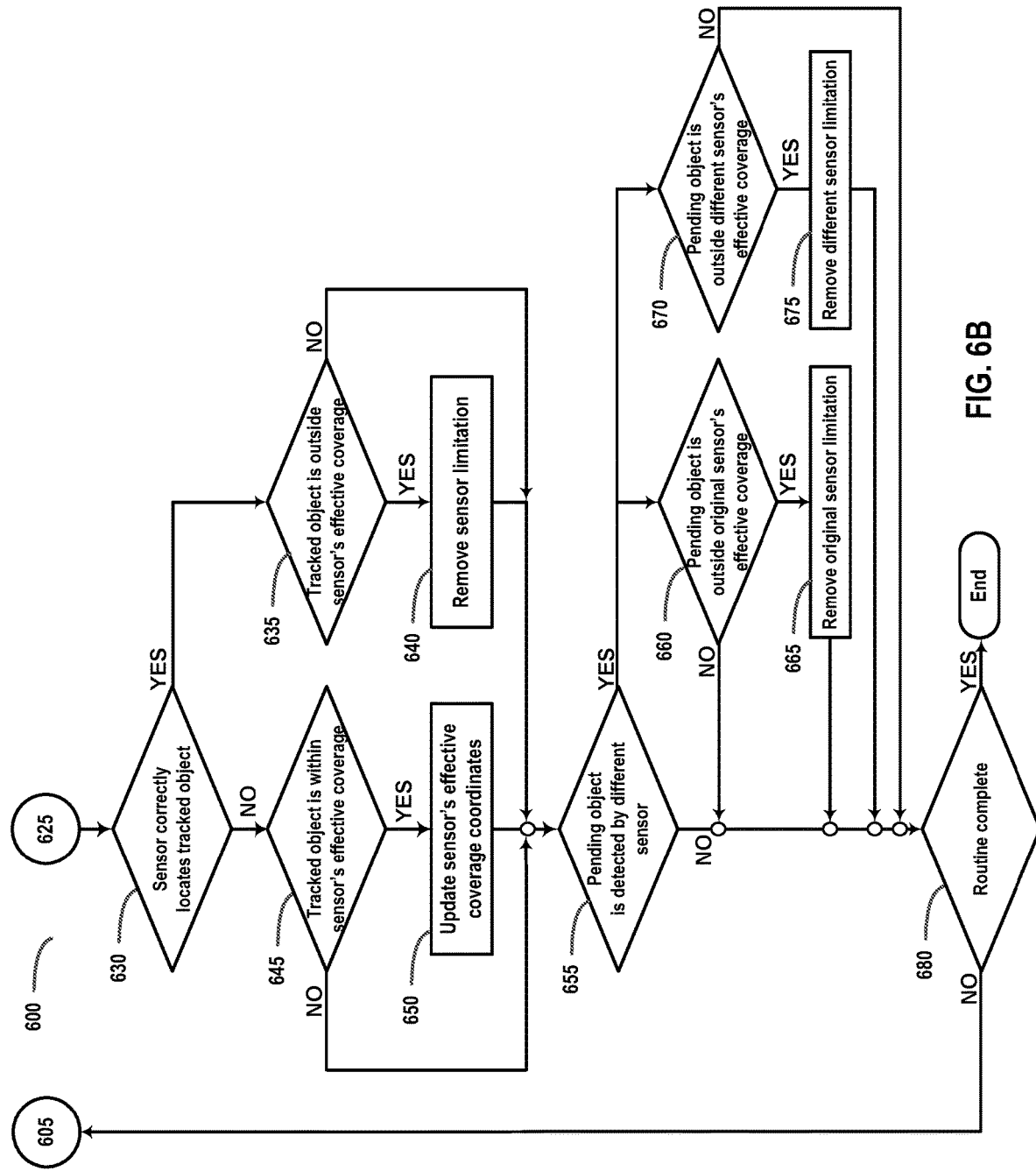

FIGS. 6A and 6B illustrate, in block diagram form, a method 600 of determining effective sensor coverage in an autonomous driving system, using object tracking and sensors, according to some embodiments. Method 600 can be implemented by sensor performance monitor 412 to use tracked objects and multiple sensors to verify effective sensor coverage area (coordinates) of a sensor.

Referring to FIG. 6A, in operation 605, a list of tracked objects and a list of pending objects can both be loaded from memory or received from perception module 302. In an embodiment, the list of tracked objects can be updated, e.g. by analyzing a recent reading of sensor data of one or more sensors to update locations of tracked objects. Tracked objects are objects that have been identified and each tracked object location has been verified. Objects can be static (not moving) or dynamic (moving). Objects can be actual, or potential, obstacles to the ADV as the ADV navigates a route. Pending objects are objects whose identification and/or location have not yet been verified.

In operation 610, the sensor coverage area for a sensor can be loaded or accessed from memory. The sensor coverage area of a sensor is the area that the sensor should be capable of sensing accurately, under design conditions. For example, a LIDAR system may have a coverage area of 360° and 100-150 meters (m) under design conditions. In a real-world environment, there can be snow, rain, hail, debris, or other objects that can obstruct the sensor coverage area of the sensor. However, the sensor may not be totally disabled by the environmental conditions in which the sensor is operated. For example, with a LIDAR system, in less than ideal conditions, the effective coverage area may still be 360° but the range may be limited to 70 meters of reliable accuracy. Thus, the effective sensor coverage area may be less than the design specification sensor coverage area, due to environmental conditions surrounding the ADV. The design specification sensor coverage area can be stored as a baseline sensor coverage area.

In operation 615, the effective sensor coverage area can be loaded or accessed from memory. As described above, the effective sensor coverage area can change dynamically based upon changes in environmental conditions surrounding the ADV. For example, the effective sensor coverage area of a camera may be substantially reduced at night, due to darkness, or in bright daylight, due to glare and lack of contrast. However the sensor, itself, has not physically or electrically failed. The environment for the sensor is simply less than ideal for the sensor.

In operation 620, it can be determined whether there is any tracked object within the current sensor coverage area. The current sensor coverage coordinates can be the design coverage area or an effective sensor coverage area, wherein the effective sensor coverage area was previously limited from the design sensor coverage area due to environmental conditions. If there is a tracked object within the current sensor coverage area, then method 600 continues at operation 625, otherwise method 600 continues at operation 605.

In operation 625, features of the tracked object within the current sensor coverage area are extracted from the senor data of the sensor.

Referring to FIG. 6B, in operations 630 through 650, a tracked object is used to dynamically adjust a sensor's effective sensor coverage area, in response to whether or not the sensor correctly locates the tracked object in an HD map.

In operation 630, it can be determined whether the tracked object is correctly located within an HD map of the area surrounding the ADV, using the extracted object features. If so, then method 600 continues at operation 635, otherwise method 600 continues at operation 645.

In operation 635, it can be determined whether the tracked object is outside of the sensor's effective coverage area. If so, then method 600 continues at operation 640, otherwise method 600 continues at operation 655.

In operation 640, a limitation on the effective coverage area of the sensor is removed to set it back to the design specification effective coverage area. In an embodiment, the effective sensor coverage area is set to an area that at least includes the tracked object. Method 600 continues at operation 655.

In operation 645, the sensor did not correctly locate the tracked object within the HD map. In operation 645, it can be determined whether the tracked object is within the effective coverage range of the sensor. If so, then method 600 continues at operation 650, otherwise method 600 continues at operation 655.

In operation 650, the tracked object was inside the sensor's effective coverage area and the sensor did not properly locate the tracked object within the HD map. Therefore, the effective sensor coverage is reduced to at least an area that excludes the tracked object.

In operations 655 through 675, a pending object and a different sensor are used to dynamically adjust the original sensor's coverage area or the different sensor's coverage area.

In operation 655, it is determined whether a pending object (location not yet verified) has been detected by a different sensor than the current sensor. If so, then method 600 continues at operations 660 and 670, in parallel. In an embodiment, the operations of 660 and 670 can be performed sequentially, in either order.

In operation 660, it can be determined whether the pending object detected by a different sensor is outside the original sensor's effective coverage area. If so, then method 600 continues at operation 665, otherwise method 600 continues at operation 680.

In operation 665, the effective sensor coverage area of the original sensor can be increased to at least an area that includes the pending object, because the combination of the original sensor and the different sensor verified the location of the pending object. The pending object has been verified and can be moved to a tracked objects list. Method 600 continues at operation 680.

In operation 670, it can be determined whether the pending object detected by the different sensor is outside the different sensor's effective coverage area. If so, then method 600 continues at operation 675 otherwise method 600 continues at operation 680.

In operation 675, the pending object has been detected by the different sensor, and the pending object is located outside of the different sensor's effective sensor coverage area. The effective sensor coverage area of the different sensor can be increased at least to include the located and verified pending object. The pending object has been verified and can be moved to a tracked objects list.

In operation 680, it can be determined whether the method (routine) 600 is complete. The routine is complete if there are no more pending objects to verify and there are no more sensors to be verified using object tracking. If the routine is complete, then method 600 ends, otherwise method 600 continues at operation 605 on FIG. 6A.

Figure 7A:
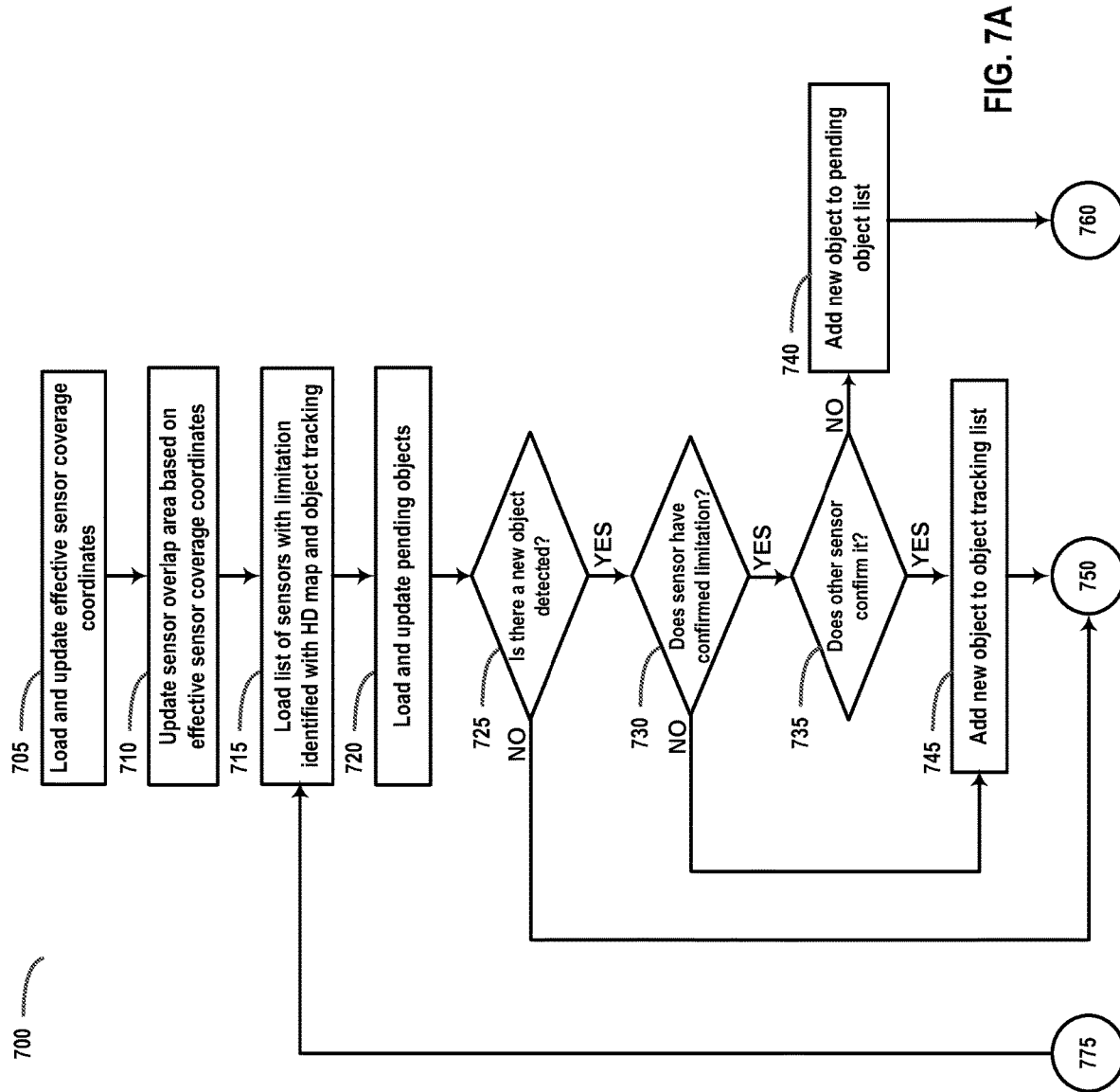
FIGS. 7A and 7B illustrate, in block diagram form, a method of determining effective sensor coverage area in an autonomous driving system, using multiple sensor confirmation, according to some embodiments.
Figure 7B:
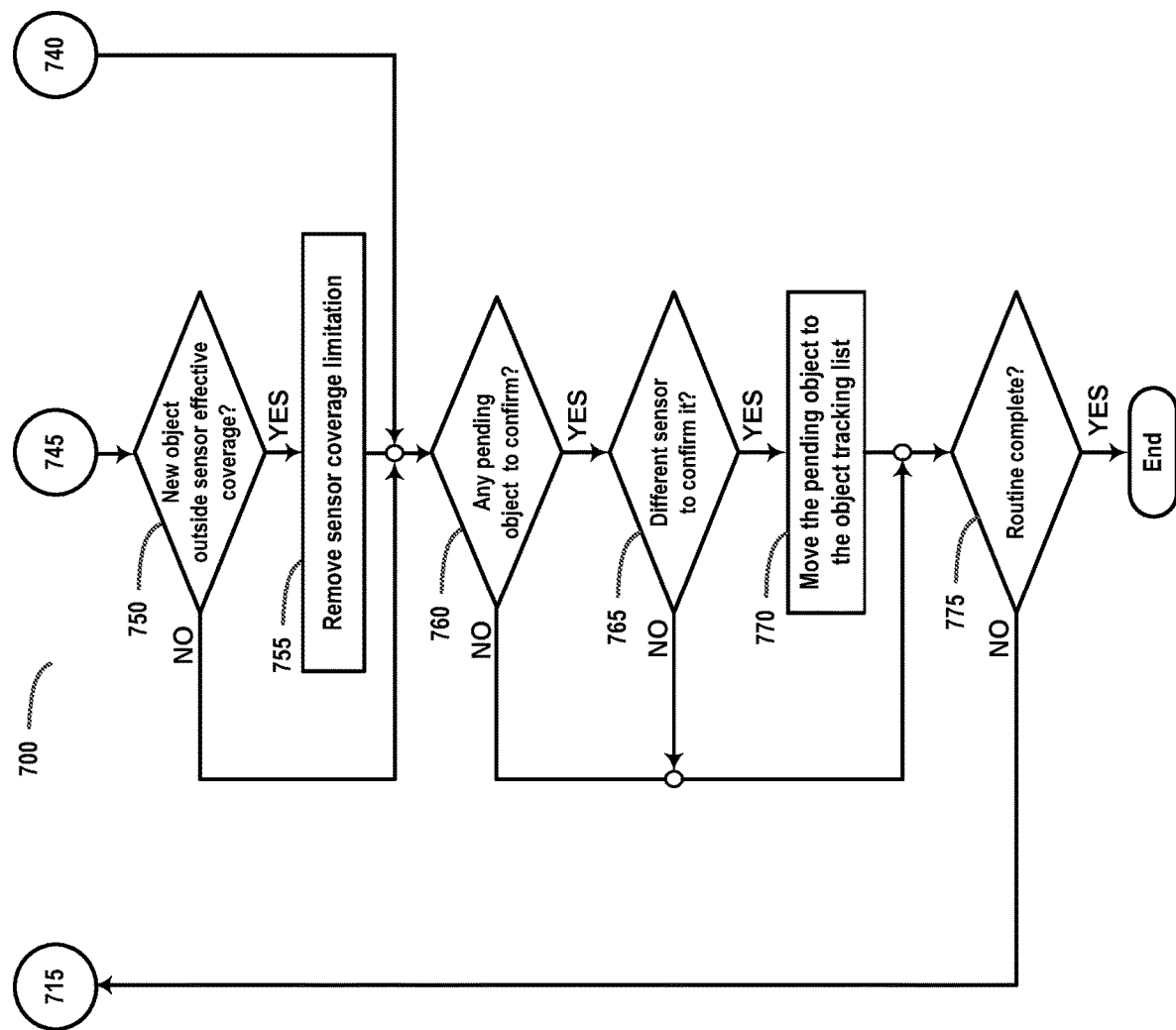

FIGS. 7A and 7B illustrate, in block diagram form, a method 700 of determining effective sensor coverage in an autonomous driving system, using multiple sensor confirmation, according to some embodiments. Method 700 can be implemented in sensor performance monitor 412, described above with reference to FIG. 4.

Referring to FIG. 7A, in operation 705, effective sensor coverage area (coordinates) of one or more sensors can be accessed or retrieved from a memory. Effective sensor coverage area may have been updated in one or more of method 500 or 600, above in sensor performance monitor 412.

In operation 710, a sensor overlap area can be generated or updated based on the effective sensor coverage areas of the one or more sensors.

In operation 715, a list of sensors that have a reduced (limited) effective coverage area, as compared to the original design sensor coverage area for the sensor, is generated or accessed. The limits reduced effective coverage areas were identified in methods 500 and 600, using static objects identified in an HD map and object tracking, respectively.

In operation 720, a list of pending objects is loaded or accessed. A pending object is an object whose location has not yet been verified. A pending object may have been partially, but not fully, identified and located due at least in part to environmental conditions that have reduced (limited) the effective sensor coverage area of one or more sensors. Many environmental conditions can change quickly (such as dark/light, snow/not snow, rain/not rain, etc.) and, thus, continuously dynamically adjusting effective sensor coverage can lead to verifying the location of a pending object.

In operation 725, it can be determined whether a new object has been detected by a sensor in the one or more sensors. If so, then method 700 continues at operation 730, otherwise method 700 continues at operation 750.

In operation 730, it can be determined whether the sensor that detected the new object has a limitation, such that the effective sensor coverage area is less than the design sensor coverage area. If so, then method 700 continues at operation 735, otherwise method 700 continues at operation 745.

In operation 735, it can be determined whether another of the one or more sensors confirms the newly detected object.

If so, then method 700 continues at operation 745, otherwise method 700 continues at operation 740.

In operation 740, the new object is not confirmed by another sensor in the one or more sensors and the new objet is added to the pending objects list, to be verified. Method 700 continues at operation 760.

In operation 745, the new object has been verified (confirmed) by another sensor and the new object is added to the object tracking list.

Referring to FIG. 7B, in operation 750, it can be determined whether the new object is outside the effective sensor coverage area of the sensor that first detected the new object. If so, then method 700 continues at operation 755, otherwise method 700 continues at method 760.

In operation 755, the new object that was detected by the sensor has been verified by the other sensor and the sensor that detected the new object has an effective sensor coverage area limitation that is less than the design sensor coverage area. In operation 755, the effective sensor coverage area limitation can be removed such that the effective sensor coverage area is increased at least to include the new object.

In operation 760 it can be determined whether there is any pending object to confirm. If so, then method 700 continues at operation 765, otherwise method 700 continues at operation 775.

In operation 765, it can be determined whether another sensor confirms the pending object. If so, then in operation 770 the pending object has been verified (confirmed) and can be moved to the tracked object list. Method 700 continues at operation 775.

In operation 775, it can be determined whether the method (routine) 700 has completed. The method 700 completes when there are no more pending objects to verify. If there are no more pending objects to verify then the method 700 ends, otherwise method 700 continues at operation 715.

Figure 8A:
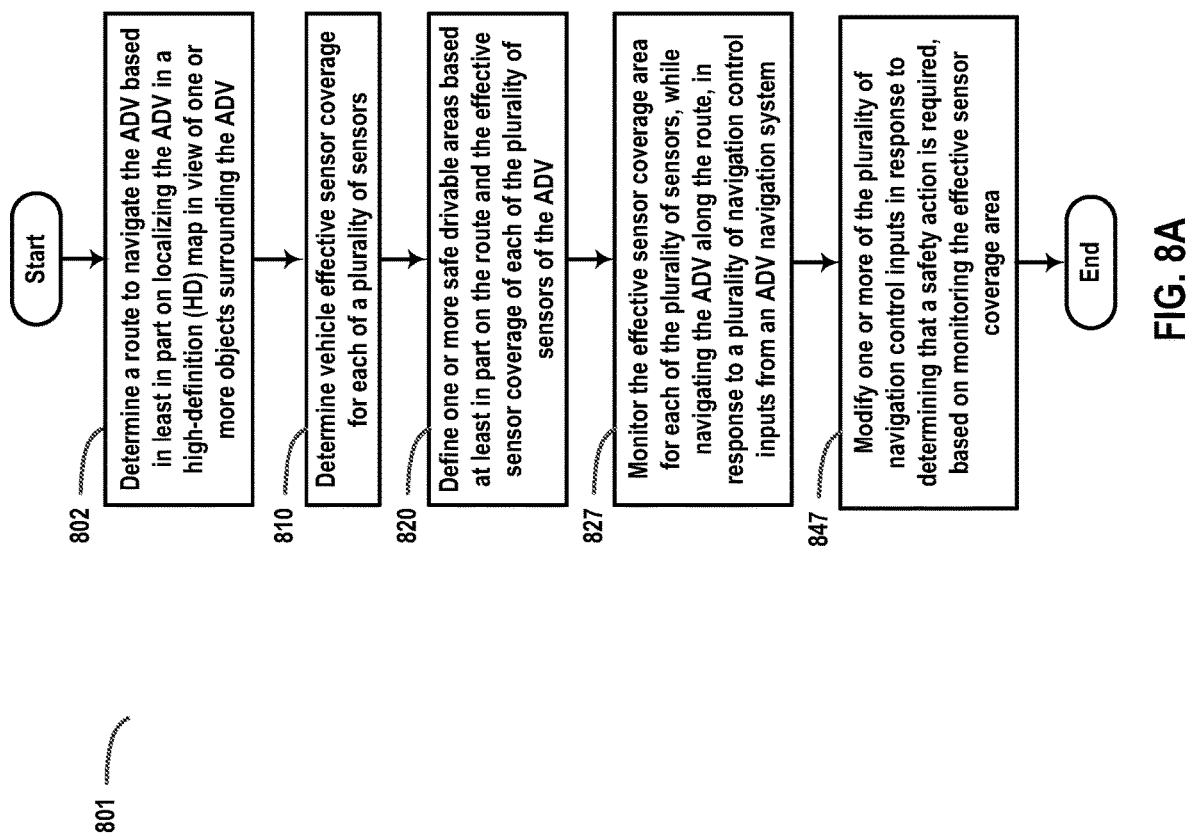
FIG. 8A illustrates, in block diagram form, a fail-operational method of safely operating an ADV, according to some embodiments.

FIG. 8A illustrates, in block diagram form, a fail-operational method 801 of safely operating an ADV, according to some embodiments.

In operation 802, the ADV determines a route to navigate the ADV based at least in part on localizing the ADV in a high-definition (HD) map, in view of one or more objects surrounding the ADV. The one or more objects can be determined from a plurality of sensors in the sensor system 115.

In operation 810, ADV logic can determine a current effective sensor coverage area for each sensor of sensor system 115. The effective sensor coverage area of a sensor takes into account that environmental conditions surrounding the ADV may not be the ideal operating conditions for the sensor. Environmental conditions affecting a sensor can vary by the type of sensor, and can include accumulating of dirt on a sensor, an intensity of light, or lack of light, and weather such as snow, rain, hail, or other impairment to ideal sensor functionality.

In operation 820, ADV logic can determine one or more safe drivable areas that the ADV may use to safely navigate the ADV in the event of impairment to the one or more sensors due to environmental conditions surrounding the ADV. The safe drivable areas can be based at least in part on the route and effective sensor coverage area of each of the plurality of sensors in the ADV. Navigating the safe drivable areas may not adhere to traffic laws and may not maximize comfort for the drives, but will provide for safely navigating the ADV to a stop.

In operation 827, the ADV can monitor the effective sensor coverage area for each of the plurality of sensors, while the ADV navigates along the route, in response to a plurality of navigation control inputs from an ADV navigation system.

In operation 847, ADV logic can modify one or more of the plurality of navigation control inputs in response to determining that a safety action is required, based on monitoring the effective sensor coverage area of each of the plurality of sensors.

Figure 8B:
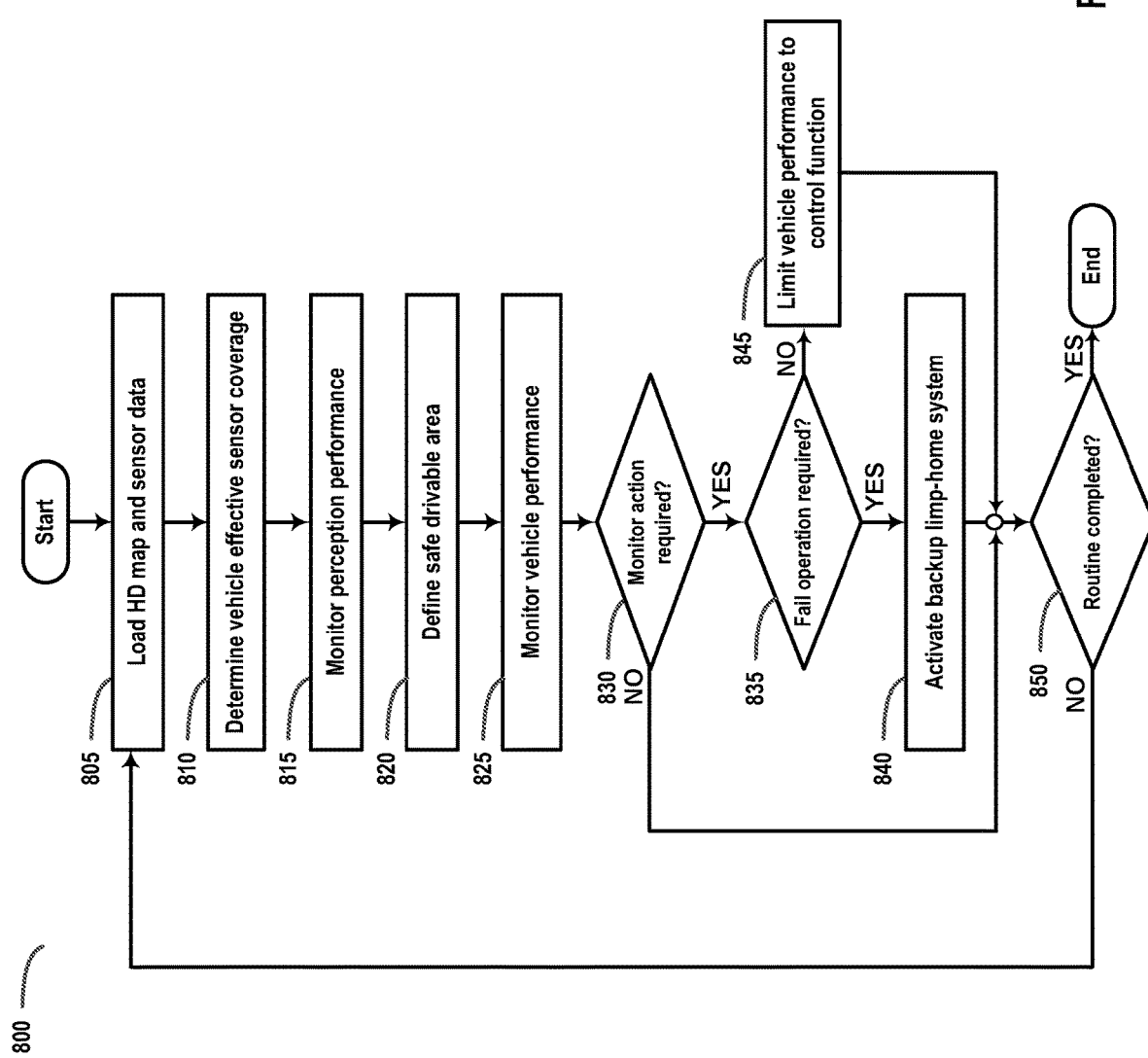
FIG. 8B illustrates, in block diagram form, a fail-operational method of safely operating an ADV, according to some embodiments.

FIG. 8B illustrates, in block diagram form, a fail-operational method 800 of safely operating an ADV, according to some embodiments. During normal operation, a perception and planning system navigates the ADV according to a planned route. Within this fail-operational method 800, it will be determined whether sensor performance has been impaired, such as due to environmental conditions surrounding the ADV, and/or whether there has been a failure to be able to localize the ADV within an HD map, such that it is necessary to navigate only within safe zones, not necessarily according to the planned route by the perception and planning module. Many operations of method 800 refer to functional blocks of the primary automated driving path 300 or the primary safety monitor path 410 which are described above with reference to FIGS. 3 and 4.

In operation 805, localization monitor 411 can load, or access, the HD map and read, or access sensor data from the plurality of sensors of sensor system 115. Localization monitor 411 can determine whether the ADV can be localized within the HD map.

In operation 810, sensor performance monitor 412 can determine a current effective sensor coverage area for each sensor of sensor system 115. The effective sensor coverage area of a sensor takes into account that environmental conditions surrounding the ADV may not be the ideal operating conditions for the sensor. Environmental conditions affecting a sensor can vary by the type of sensor, and can include accumulating of dirt on a sensor, an intensity of light, or lack of light, and weather such as snow, rain, hail, or other impairment to ideal sensor functionality.

In operation 815, safety perception 413 and perception monitor 415 can monitor the performance of the perception module 302. Safety perception module 413 can identify safety critical objects within a region of interest (ROI) of the ADV. Perception monitor 415 can determine a final list of safety critical static and dynamic objects that the ADV must take into account to safely navigate the ADV. The list of safety-critical object may include objects that occur in safe drivable areas of the ADV that may be in addition to areas that the ADV planning module 305 intends to use as drivable areas. Safe drivable areas may include parking or road shoulder areas where the ADV may pull over and stop in an emergency.

In operation 820, drive safe path module 416 can determine one or more safe drivable areas that the ADV may use to safely navigate the ADV in the event of impairment to the one or more sensors due to environmental conditions surrounding the ADV. Navigating the safe drivable areas may not adhere to traffic laws and may not maximize comfort for the drives, but will provide for safely navigating the ADV to a stop.

In operation 825, plan monitor 417 can receive the planned ADV trajectory (route) from planning module 305, and the list of safe driving areas from define safe path module 416. Plan monitor 417 can ensure that the planned ADV trajectory stays within the safe drivable areas determined by define safe path module 416.

In operation 830, if plan monitor 417 determines that the vehicle does not follow the safe drivable areas, then automated system performance monitor 418 can determine whether a monitor action is required. A monitor action includes: (1) no action: allow the route planned by the planning module 305 to proceed (control commands pass-through and are executed); (2) request that control module 306 limit or modify one or more of the control commands for the ADV route navigation (speed, braking, throttle); or (3) determine that a fail-operational action is required. If a fail-operation is required, then method 800 continues at operation 840, otherwise method 800 continues at operation 845.

In operation 840, automated system performance monitor 418 has determined that a fail-operational action is required. Automated system performance monitor 418 instructs limp-home monitor 428 to proceed to a safe stop location within the drivable areas and stop the ADV, or to just stop the ADV. Method 800 continues at operation 850.

In operation 845, it has been determined that a fail-operational action is not required. Automated system performance monitor 418 requests the control module 306 to modify/limit one or more control commands (throttle, steering, braking) to ensure that the ADV navigates within the safe drivable areas.

In operation 850, it can be determined whether the method (routine) 800 has completed. The routine is completed when the ADV has either reached the destination in the original ADV route, limited the vehicle performance to safe drivable areas (in the case of a monitor action that does not require a fail-operational action) or fully executed a fail-operational action. If the routine is not completed, the method 800 continues at operation 805, otherwise the method 800 ends.

Figure 9:
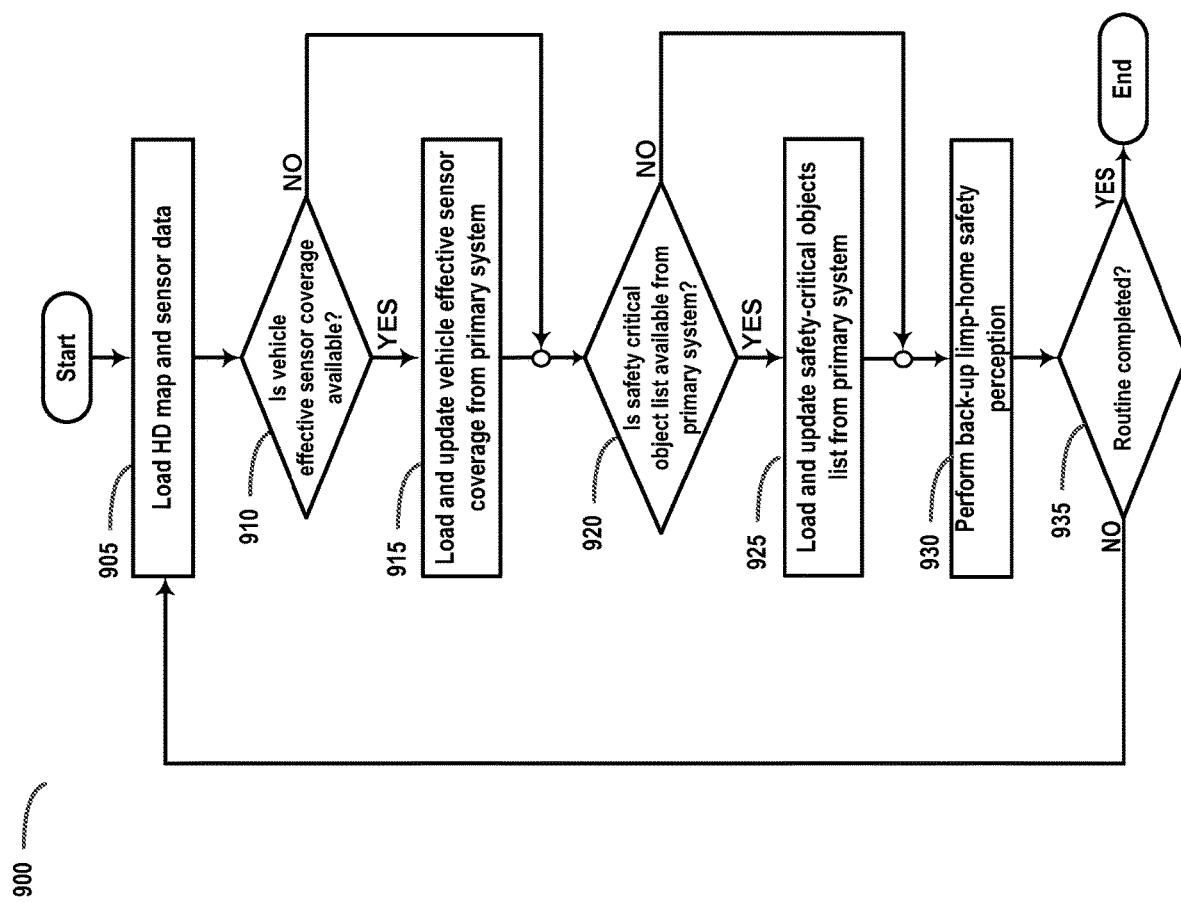
FIG. 9 illustrates, in block diagram form, a "limp-home" perception method for safely operating an ADV, according to some embodiments.

FIG. 9 illustrates, in block diagram form, a "limp-home" perception method 900 for safely operating an ADV, according to some embodiments.

In operation 905, a high-definition (HD) can be loaded or accessed. Localization module 301 and/or localization monitor 411 can both have access to the HD map and can share a reference to the HD map to load or access the map.

In operation 910, it can be determined whether ADV effective sensor coverage area information is available. Effective sensor coverage area information for all ADV sensors in sensor system 115 will generally be available, unless there is a fault of some kind in one or more of the sensors that precludes obtaining sensor data for that sensor. In response to determining that effective sensor coverage area is available for one or more sensors, then in operation 915, the effective sensor coverage area for the one or more sensors is loaded or accessed from sensor performance monitor 412, or a storage or memory of the ADV.

In operation 920, it can be determined whether a list of safety-critical objects is available from the primary safety monitor path 410, safety perception module 413. Safety perception module 413 identifies a list of safety-critical objects within a range of interest of the ADV that may affect safe drivable areas for the ADV. If the list of safety-critical objects is available from the primary safety monitor path 410, then in operation 925, the safety-critical objects list from safety perception module 413 is loaded or accessed from a memory. The safety perception module 413 is described above with reference to FIG. 4.

In operation 930, limp-home perception 423 can receive and store a list of safety critical static and dynamic objects received from safety perception module 413. Dynamic objects can include moving objects that are within the region of interest of the ADV path, and those dynamic objects that are outside the region of interest but may intercept the region of interest based upon a predicted trajectory for the dynamic objects. Limp-home perception can identify objects within the received list of static and dynamic objects that are most relevant to a limp-home path. A limp-home path is path to a safe drivable area where the ADV can be stopped. If there is no such safe drivable area, the ADV can just be stopped, rather than continue unsafely.

In operation 935, it can be determined whether the method 900 is completed. If so, then the method 900 ends, otherwise method 900 continues at operation 905. In practice, method 900 is a backup system to safety monitors that are an active part of a primary safety monitor 410 and, as such, operate continuously. In an embodiment, method 900 could be invoked whenever (1) localization monitor 411 indicates that the vehicle cannot be localized or (2) whenever sensor performance module 412 indicate that a sensor has a limitation upon its effective sensor coverage area.

FIG. 10 illustrates, in a table form, how combinations of sensors having varying effective coverage ranges can be used to navigate and ADV. For simplicity, the table is shown using three states of effective coverage area: good, fair, and poor. Good may construed as at, or near, the design specification coverage area for the sensor. Fair may be construed as limited to some degree, but still usable. Poor may be construed as very limited. Limitations on effective coverage are due to environmental conditions, rather than component failure. In practice, effective sensor coverage is dynamically adjusted in response to changing environmental conditions and is rarely a static condition. For example, a sensor may experience darkness in a shadow or in a tunnel, limiting its effective sensor coverage area, and the sensor effective coverage area will be dynamically increased when the ADV exits the tunnel. Table 1000 indicates a plurality of features 1010 through 1045 that are determined from a plurality of sensors, including a camera, RADAR, and LIDAR. A combination of these sensors, "Camera+Radar+LIDAR," can detect the feature 1010 through 1045, even if each individual sensor may not be operating at design specification sensor coverage area.

Item 1010 indicates a feature of "Object Detection." Object detection is the ability of the combined sensors to detect the presence of an object. In the example of item 1010, an effective camera coverage area and an effective RADAR coverage area have been reduced to "fair," due to environmental conditions surrounding the ADV. LIDAR coverage is, however, still good. Using the LIDAR, and optionally in combination with an HD map, an object can be detected. Thus, the combination of Camera+RADAR+LIDAR can have good object detection 1010.

Item 1015 indicates a feature of "Object classification." Object classification may be, for example, detecting the color of a traffic light. With the good camera effective coverage area, bad LIDAR effective coverage area, and fair LIDAR effective coverage area, the combination of sensors can classify a detected object.

Similarly, in items 1020 and 1035, one of RADAR or LIDAR having a good effective coverage area and camera or LIDAR being fair effective coverage area is enough to estimate distance and velocity.

Item 1030 indicates that range of visibility can be performed with RADAR having good effective sensor coverage area, and one or both of camera and/or LIDAR having fair effective sensor coverage area.

Item 1035 indicates that lane tracking can be performed with just good camera effective sensor coverage area and poor effective sensor coverage area for both RADAR and LIDAR.

Item 1040 indicates that combined sensor functionality in bad weather can still be good, even if camera effective sensor coverage area is poor and LIDAR effective sensor coverage is fair.

Item 1045 indicates that combined sensor functionality in poor lighting can still be good, even if camera effective sensor coverage is fair and LIDAR and RADAR effective sensor coverage area is good.

Figure 11:
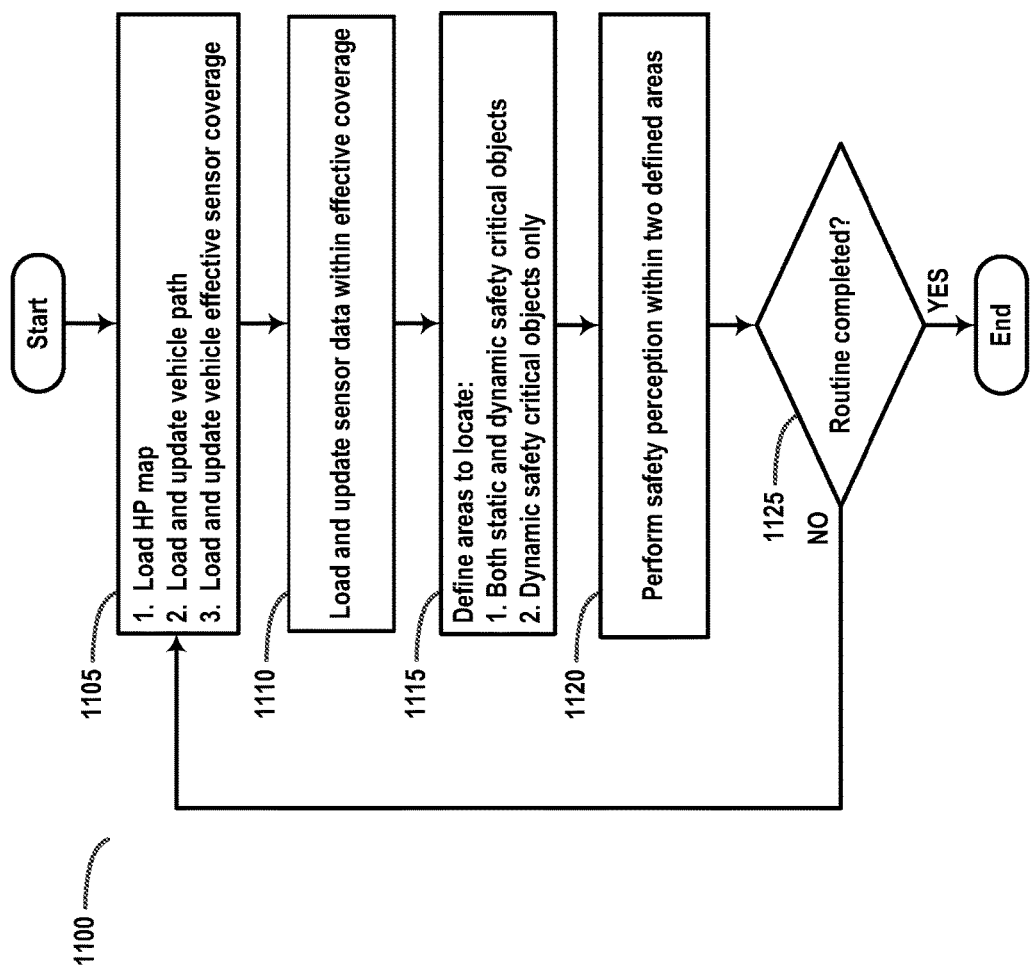
FIG. 11 illustrates, in block diagram form, a method performing safety perception for an ADV in accordance with some embodiments.

FIG. 11, illustrates, in block diagram form, a method 1100 performing safety perception for an ADV in accordance with some embodiments.

In operation 1105, localization monitor 411 can load or access the high-definition (HD) map that is used to localize the ADV. Localization monitor 411 ensures that the localization functionality works properly and can determine the ADV location with respect to the HD map. Sensor performance monitor 412 can load and update effective sensor coverage area for each of a plurality of sensors in sensor system 115. Effective sensor coverage area accounts for reduced functionality of one or more sensors based upon environmental conditions surrounding the ADV. Safety perception module 413 can receive the planned ADV navigation route from planning module 305.

In operation 1110, sensor performance monitor 412 can load and update sensor data, e.g. from performance perception module 302, within the effective sensor coverage area from the sensors. Sensor performance monitor 412 can access and load stored effective sensor coverage area information for each sensor, from a memory or storage. Thus, loading and updating sensor data can include limiting the amount of sensor data loaded to only the sensor data that is within the effective sensor coverage area for each sensor.

In operation 1115, two areas are defined for identifying safety-critical objects, with respect to a range of interest along the planned route and within the effective sensor coverage area for each sensor. The first area is the area where the ADV is to navigate along the route or path retrieved from the planning module 305 in operation 1105. Sensor data is analyzed to determine both static objects (non-moving) and dynamic (moving) objects that the ADV may intercept along the route. The second area is outside the first area, but within a region of interest with respect to the first area. In the second area, sensor data within a region of interest from the ADV route and within the effective coverage area for each sensor, is to be analyzed to determine dynamic (moving) objects that may intercept the ADV along the planned path. The region of interest includes areas that are in addition to the first area and can be used to locate safe drivable areas by define safe path module 416.

In operation 1120, safety perception is performed within the two defined areas, as described in operation 1115. The result is a list of safety-critical dynamic and static objects in the first area and safety-critical dynamic objects in the second area. Safety-critical objects are those objects which the ADV may intercept.

In operation 1125, it can be determined whether the method (routine) 1100 is completed. If so, then the method 1100 ends, otherwise the method 1100 continues at operation 1105. In practice, method 900 is a safety monitor that is an active part of primary safety monitor 410 and may operate continuously. In an embodiment, method 1100 could be invoked whenever (1) localization monitor 411 indicates that the vehicle cannot be localized or (2) whenever sensor performance module 412 indicates that a sensor has a limitation upon its effective sensor coverage area.

Figure 12A:
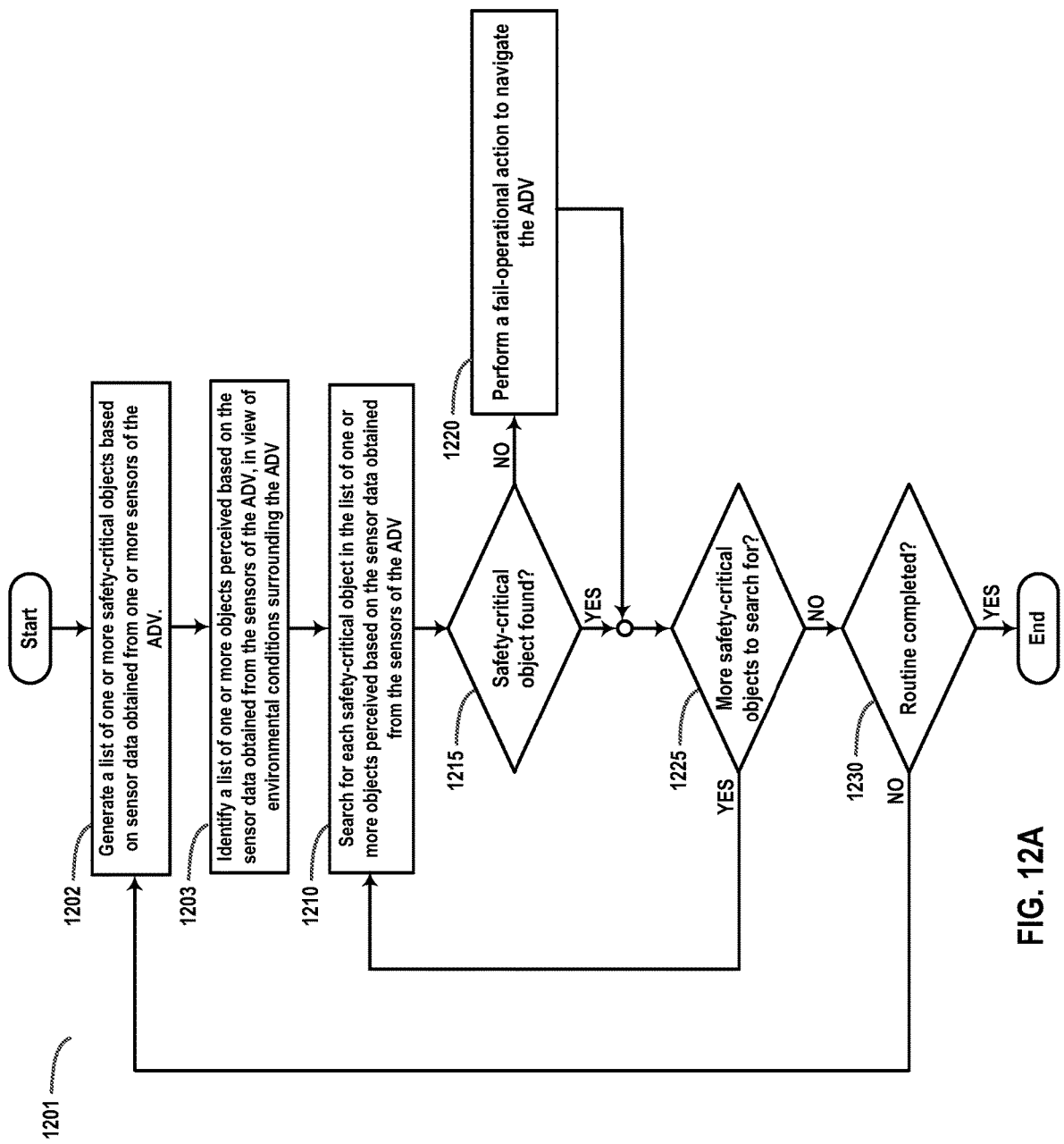
FIG. 12A illustrates, in block diagram form, a method performing safety monitor for an ADV in accordance with some embodiments.

FIG. 12A, illustrates, in block diagram form, a method 1201 performing safety monitor for an ADV in accordance with some embodiments. Method 1201 can be implemented in perception monitor 415 described above with reference to FIG. 4.

In operations 1202, ADV logic can generate a list of one or more safety critical objects based on sensor data obtained from one or more sensors of the ADV. Safety-critical objects can include one or more static objects and one or more dynamic objects that are located in a first area that is overlapping at least a portion of a drivable path of the ADV.

In operation 1203, ADV logic can identify a list of one or more objects perceived based on the sensor data obtained from the sensors of the ADV in view of the environmental conditions surrounding the ADV.

In operation 1210, for each of the safety-critical objects, in operation 1215 it can be determined whether the safety-critical object is in the list of one or more objects by searching the list of objects to find the safety-critical object. If the safety-critical object is not found in the list of one or more objects, then in operation 1220, the ADV can perform a fail-operational action to navigate the ADV.

In operation 1225, it can be determined whether there are more safety-critical objects to search for in the list of one or more objects. If so, then method 1200 continues at operation 1210, otherwise method 1200 continues at operation 1230.

In operation 1230, it can be determined whether the method (routine) 1201 is completed. In practice, method 1201 is a safety monitor that is an active part of primary safety monitor 410 and operates continuously. In an embodiment, method 1201 could be invoked whenever (1) localization monitor 411 indicates that the vehicle cannot be localized or (2) whenever sensor performance module 412 indicates that a sensor has a limitation upon its effective sensor coverage area.

Figure 12B:
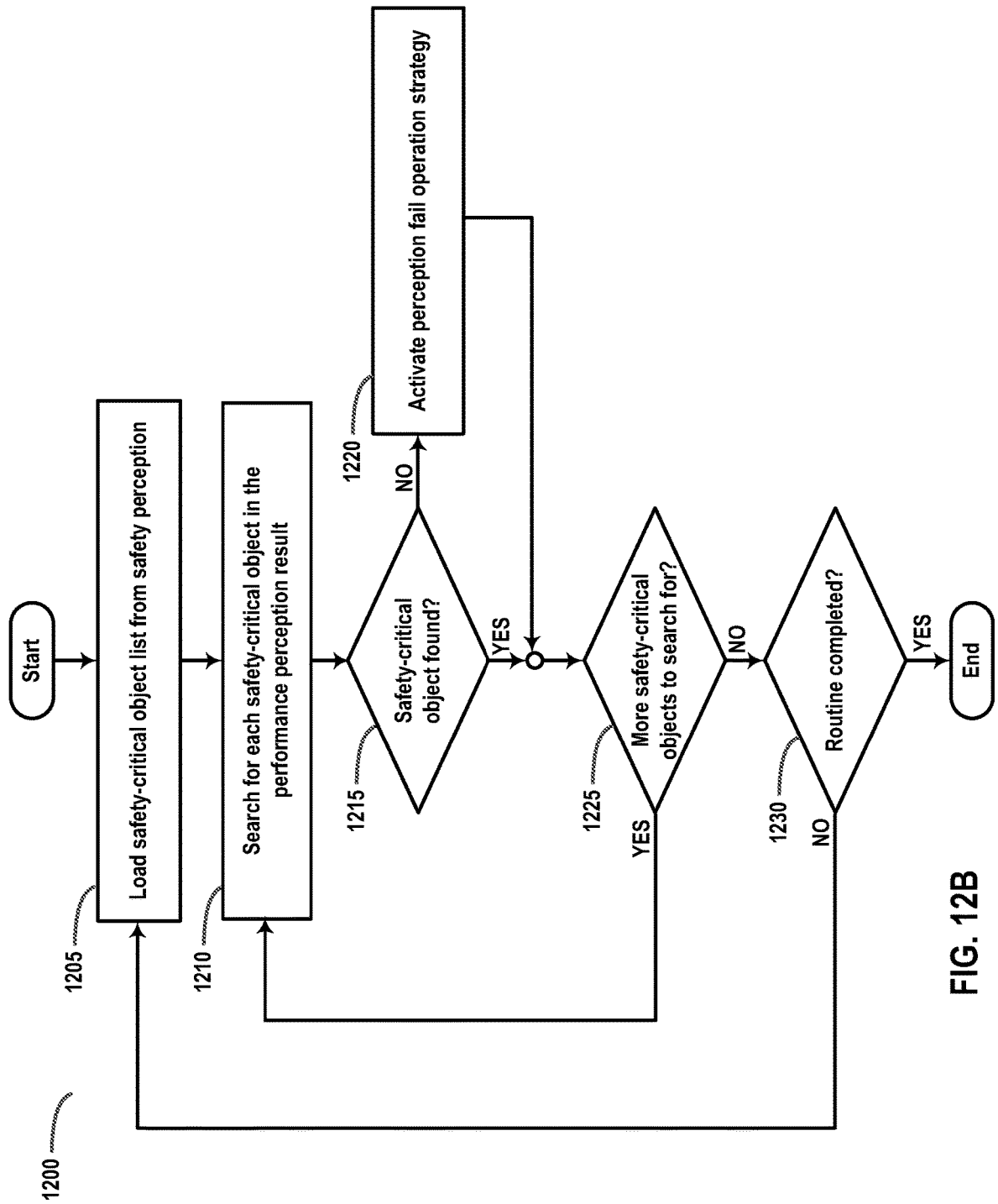
FIG. 12B illustrates, in block diagram form, a method performing safety monitor for an ADV in accordance with some embodiments.

FIG. 12B, illustrates, in block diagram form, a method 1200 performing safety monitor for an ADV in accordance with some embodiments. Method 1200 can be implemented in perception monitor 415 described above with reference to FIG. 4.

In operations 1205, perception monitor 415 can receive and load the list of safety-critical objects determined by safety perception module 413 in method 1100, above.

In operation 1210, perception monitor 415 can receive a list of objects perceived by performance perception module 302. The objects in the list received from the performance perception module are both static and dynamic objects along, or within a region of interest, the driving path. For each safety-critical object in the safety-critical list of objects, in operation 1215 it can be determined whether the safety-critical object is in the list of objects received from performance perception 302 by searching the performance perception objects to find the safety-critical object. If the safety-critical object was not found in the list of objects from the performance perception module 302, then the ADV route planned by planning module 305 was based on a list of performance perception objects that does not take into account one or more safety-critical objects, and in operation 1220 a perception fail-operational strategy is activated.

In operation 1225, it can be determined whether there are more safety-critical objects to search for in the list of objects received from the performance perception module 302. If so, then method 1200 continues at operation 1210, otherwise method 1200 continues at operation 1230.

In operation 1230, it can be determined whether the method (routine) 1200 is completed. In practice, method 1200 is a safety monitor that is an active part of primary safety monitor 410 and operates continuously. In an embodiment, method 1200 could be invoked whenever (1) localization monitor 411 indicates that the vehicle cannot be localized or (2) whenever sensor performance module 412 indicates that a sensor has a limitation upon its effective sensor coverage area.

Figure 13:
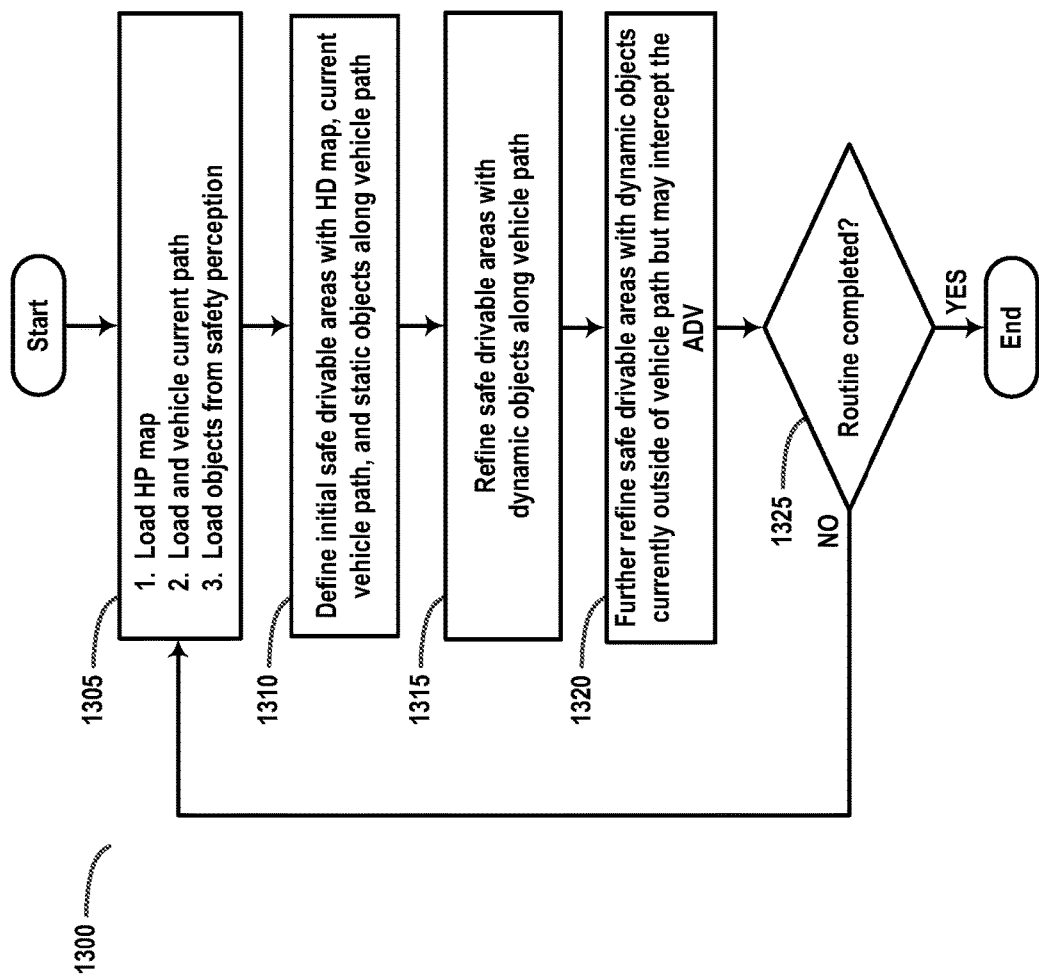
FIG. 13 illustrates, in block diagram form, a method of defining a safe drivable area for safely operating an ADV, according to some embodiments.

FIG. 13 illustrates, in block diagram form, a method 1300 of defining a safe drivable area for safely operating an ADV, according to some embodiments. Safe drivable areas contain additional areas than those considered by planning module 305 for planning a route for the ADV. Safe drivable areas include areas where the ADV can make a fail-operational emergency maneuver, such as pulling off to a side of a roadway, an off-ramp, or a parking area. Method 1300 can be implemented in define safe path module 416.

In operation 1305, localization monitor 411 can load or access the high-definition (HD) map that is used to localize the ADV. Localization monitor 411 ensures that the localization functionality works properly and can determine the ADV location with respect to the HD map. Safety perception module 413 can receive the planned ADV navigation route from planning module 305 which can be passed to perception monitor 415 and define safe path module 416. Define safe path module 416 can load the final safety-critical objects list generated by perception monitor 415 in method 1200. The safety-critical objects list contains static and dynamic objects along the ADV navigation route, and dynamic objects with a region of interest outside of the ADV navigation route, that may intercept the ADV along the navigation route.

In operation 1310, define safe path monitor 416 can define initial safe drivable areas using the HD map, the ADV location within the HD map, current ADV navigation path, and static objects along the ADV navigation path.

In operation 1315, define safe path monitor 416 can refine the safe drivable areas from the initial safe drivable areas in operation 1310 by accounting for dynamic objects along the ADV navigation path.

In operation 1320, define safe path monitor 416 can further refine the safe drivable areas from operation 1315 by further accounting for dynamic objects that are outside the ADV navigation path but are within a region of interest where a dynamic object may intercept the ADV while the ADV is navigating the path.

In operation 1325, it can be determined whether the method (routine) 1300 is completed. If so, then the method 1300 ends, otherwise the method 1300 continues at operation 1305. In practice, the method 1300 implements a portion of primary safety monitor path 410 and would normally operate continuously so that the ADV can quickly react to a change in sensor coverage area to take a fail-operational action. In an embodiment, method 1300 could be performed in response to localization monitor 411 detecting a loss of ability to localize the ADV within the HD map, or in response to the sensor performance monitor 412 detecting a substantial reduction of effective sensor coverage in one or more sensors.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 14:
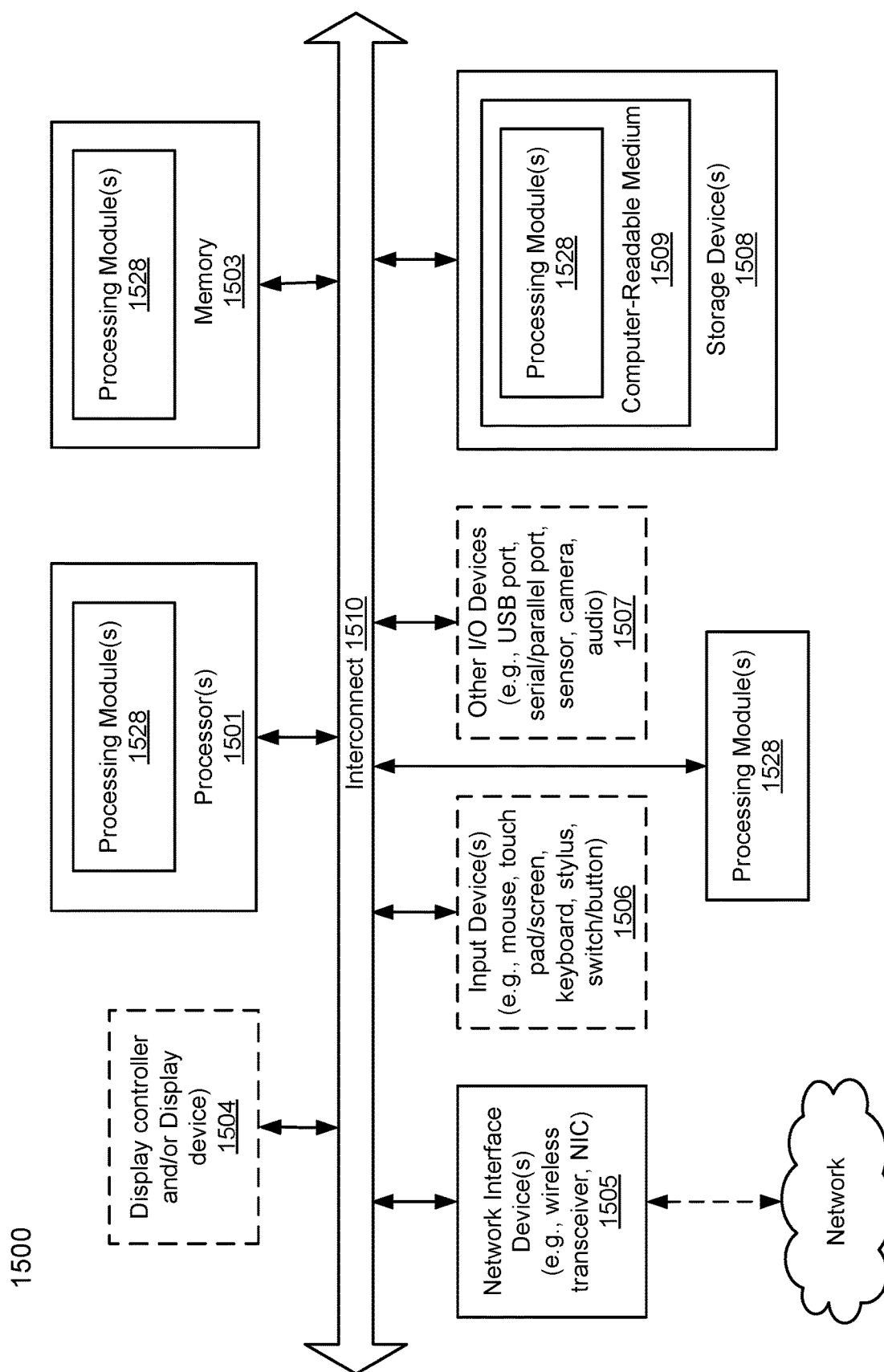
FIG. 14 is a block diagram illustrating a data processing system according to one embodiment.

FIG. 14 is a block diagram illustrating an example of a data processing system which may be used with one embodiment of the disclosure. For example, system 1500 may represent any of data processing systems described above performing any of the processes or methods described above, such as, for example, any of the functionality of the primary safety monitor path 410 and or back-up limp-home safety monitor path 420, as shown in FIG. 4. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a Smartwatch, a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 connected via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Robot Operating System (ROS), Windows® operating system from Microsoft®, Mac OS®/iOS® from Apple, Android® from Google®, LINUX, UNIX, or other real-time or embedded operating systems.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including BIOS as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Processing module/unit/logic 1528 may represent any of the components described above, such as, for example, planning module 305, control module 306, safety monitor module 308, limp-home safety monitor module 309, primary safety monitor path 410, or back-up limp-home safety monitor path 420. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present disclosure. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present disclosure. It will also be appreciated that network computers, handheld computers, mobile phones, servers, and/or other data processing systems which have fewer components or perhaps more components may also be used with embodiments of the disclosure.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method of safely navigating an autonomous driving vehicle (ADV) having an automated driving system and a safety monitor system that operates in parallel with the automated driving system, the method comprising:

determining, by the automated driving system, a route to navigate the ADV based at least in part upon localizing the ADV in a high-definition (HD) map in view of one or more objects surrounding the ADV perceived using a plurality of sensors of the ADV;

while the automated driving system navigates the ADV along the route, performing, by the safety monitor system:

receiving, from the automated driving system, localization information and a list of the one or more objects surrounding the ADV perceived using the plurality of sensors;

monitoring and dynamically adjusting stored effective sensor coverage area of each of the plurality of sensors of the ADV;

defining one or more safe drivable areas, based at least in part on the route and based on other drivable areas not on the route in a region of interest around the ADV, and based on the dynamically adjusted effective sensor coverage area of each of the plurality of sensors of the ADV; and modifying one or more of a plurality of navigation control inputs of the automated driving system in response to determining, by the safety monitor system, that a fail-operational safety action is required based on monitoring the dynamically adjusted effective sensor coverage area and the localization information.

2. The method of claim 1, wherein modifying one or more of the plurality of navigation control inputs comprises:

determining that a localization system of the automated driving system fails to correctly locate the ADV within the HD map; and modifying one or more control inputs to stop the ADV.

3. The method of claim 1, wherein modifying one or more of the plurality of navigation control inputs comprises:

determining that the monitored and dynamically adjusted effective sensor coverage area of a sensor in a perception system of the automated driving system is too small for a current speed of the ADV; and reducing a throttle input, and/or increasing a braking input, of the plurality of navigation control inputs, to reduce the current speed of the ADV.

4. The method of claim 1, further comprising, in response to determining that the fail-operational safety action is not required, executing the plurality of control inputs of the automated driving system to navigate the ADV along the route.

5. The method of claim 1, wherein monitoring and dynamically adjusting the stored effective sensor coverage area of each of the plurality of sensors of the ADV includes comparing, for each static object in the list of one or more objects, a location of the static object in the HD map and an ability of the sensor to correctly identify and locate the static object; and wherein defining safe drivable areas further comprises:

identifying a plurality of objects representing obstacles to the ADV along the route;

generating a plurality of safety critical objects surrounding the ADV, based at least in part on the plurality of objects and the effective sensor coverage area of each of the plurality of sensors of the ADV, and;

determining a plurality of safe areas to navigate the ADV taking into account the plurality of safety-critical objects.

6. The method of claim 1, wherein the safe drivable areas comprise areas that are in addition to areas considered by an ADV planning module when generating the route.

7. The method of claim 1, wherein modifying one or more of the plurality of navigation control inputs comprises generating control inputs to perform one of:
   navigating to one of the safe drivable areas and stopping the ADV; or
   stopping the ADV.

8. A non-transitory machine-readable medium having instructions stored therein, which when executed by a processor, cause the processor to perform operations of safely navigating an autonomous driving vehicle (ADV) having an automated driving system and a safety monitor system that operates in parallel with the automated driving system, the operations comprising:
   determining, by the automated driving system, a route to navigate the ADV based at least in part upon localizing the ADV in a high-definition (HD) map in view of one or more objects surrounding the ADV perceived by a plurality of sensors of the ADV;
   while the automated driving system navigates the ADV along the route, performing, by the safety monitor system:
   receiving, from the automated driving system, localization information and a list of the one or more objects surrounding the ADV perceived using the plurality of sensors;
   monitoring and dynamically adjusting stored effective sensor coverage area of each of the plurality of sensors of the ADV;
   defining one or more safe drivable areas, based at least in part on the route and on other drivable areas in a region of interest around the ADV, and based on the dynamically adjusted effective sensor coverage area of each of the plurality of sensors of the ADV; and
   modifying one or more of a plurality of navigation control inputs of the automated driving system in response to the safety monitor system determining, by the safety monitor system, that a fail-operational safety action is required based on monitoring the dynamically adjusted effective sensor coverage area and the localization information.

9. The medium of claim 8, wherein modifying one or more of the plurality of navigation control inputs comprises:
   determining that a localization system of the automated driving system fails to correctly locate the ADV within the HD map; and
   modifying one or more control inputs to stop the ADV.

10. The medium of claim 8, wherein modifying one or more of the plurality of navigation control inputs comprises:
    determining that the monitored and dynamically adjusted effective sensor coverage area of a sensor in a perception system of the automated driving system is too small for a current speed of the ADV; and
    reducing a throttle input, and/or increasing a braking input, of the plurality of navigation control inputs, to reduce the current speed of the ADV.

11. The medium of claim 8, further comprising, in response to determining that the fail-operational safety action is not required, executing the plurality of control inputs of the automated driving system to navigate the ADV along the route.

12. The medium of claim 8, wherein the monitoring and dynamically adjusting the stored effective sensor coverage area of each of the plurality of sensors of the ADV includes comparing, for each static object in the list of one or more objects, a location of the static object in the HD map and an ability of the sensor to correctly identify and locate the static object; and wherein defining safe drivable areas further comprises:
    identifying a plurality of objects representing obstacles to the ADV along the route;
    generating a plurality of safety critical objects surrounding the ADV, based at least in part on the plurality of objects and the effective sensor coverage area of each of the plurality of sensors of the ADV, and;
    determining a plurality of safe areas to navigate the ADV taking into account the plurality of safety-critical objects.

13. The medium of claim 8, wherein the safe drivable areas comprise areas that are in addition to areas considered by an ADV planning module when generating the route to navigate the ADV.

14. The medium of claim 8, wherein modifying one or more of the plurality of navigation control inputs comprises generating control inputs to perform one of:
    navigating to one of the safe drivable areas and stopping the ADV; or
    stopping the ADV.

15. A data processing system, comprising:
    a processor; and
    a memory coupled to the processor to store instructions, which when executed by the processor, cause the processor to perform operations to safely navigate an autonomous driving vehicle (ADV) having an automated driving system and a safety monitor system that operates in parallel with the automated driving system, the operations including:
    determining, by the automated driving system, a route to navigate the ADV based at least in part upon localizing the ADV in a high-definition (HD) map in view of one or more objects surrounding the ADV perceived using a plurality of sensors of the ADV;
    while the automated driving system navigates the ADV along the route, performing, by the safety monitor system:
      receiving, from the automated driving system, localization information and a list of the one or more objects surrounding the ADV perceived using the plurality of sensors;
      monitoring and dynamically adjusting stored effective sensor coverage area of each of the plurality of sensors of the ADV;
    defining one or more safe drivable areas, based at least in part on the route and on other drivable areas not on the route in a region of interest around the ADV, and based on the dynamically adjusted effective sensor coverage area of each of the plurality of sensors of the ADV; and
      modifying one or more of a plurality of navigation control inputs of the automated driving system in response to determining, by the safety monitor system, that a fail-operational safety action is required based on monitoring the dynamically adjusted effective sensor coverage area and the localization information.

16. The system of claim 15, wherein modifying one or more of the plurality of navigation control inputs comprises:
    determining that a localization system of the automated driving system fails to correctly locate the ADV within the HD map; and
    modifying one or more control inputs to stop the ADV.

17. The system of claim 15, wherein modifying one or more of the plurality of navigation control inputs comprises:

determining that the monitored and dynamically adjusted effective sensor coverage area of a sensor in a perception system of the automated driving system is too small for a current speed of the ADV; and reducing a throttle input, and/or increasing a braking input, of the plurality of navigation control inputs, to reduce the current speed of the ADV.

18. The system of claim 15, further comprising, in response to determining that the fail-operational safety action is not required, executing the plurality of control inputs of the automated driving system to navigate the ADV along the route.

19. The system of claim 15, wherein monitoring and dynamically adjusting the stored effective sensor coverage area of each of the plurality of sensors of the ADV includes comparing, for each static object in the list of one or more objects, a location of the static object in the HD map and an ability of the sensor to correctly identify and locate the static object; and wherein defining safe drivable areas further comprises:

identifying a plurality of objects representing obstacles to the ADV along the route;

generating a plurality of safety critical objects surrounding the ADV, based at least in part on the plurality of objects and the effective sensor coverage area of each of the plurality of sensors of the ADV, and;

determining a plurality of safe areas to navigate the ADV taking into account the plurality of safety-critical objects.

20. The system of claim 15, wherein the safe drivable areas comprise areas that are in addition to areas considered by an ADV planning module when generating the route to navigate the ADV.

21. The system of claim 15, wherein modifying one or more of the plurality of navigation control inputs comprises generating control inputs to perform one of:

navigating to one of the safe drivable areas and stopping the ADV; or stopping the ADV.

* * * * *